(12) United States Patent
Yoshizawa

(10) Patent No.: US 6,731,398 B1
(45) Date of Patent: May 4, 2004

(54) PRINTING APPARATUS, METHOD OF PRINTING, AND RECORDING MEDIUM TO ACTUALIZE THE METHOD

(75) Inventor: Koichi Yoshizawa, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/476,778

(22) Filed: Dec. 30, 1999

(51) Int. Cl.⁷ .............................................. G06F 15/00
(52) U.S. Cl. ......................... 358/1.2; 358/1.1; 358/1.4; 358/1.8
(58) Field of Search .......................... 358/1.1, 1.2, 1.4, 358/1.5, 1.8, 1.9, 1.12, 1.13, 131, 136, 240, 251, 252, 253, 254, 255, 256, 257

(56) References Cited

U.S. PATENT DOCUMENTS 5,706,046 A * 1/1998 Eki et al. ..................... 347/252
5,975,673 A * 11/1999 Ohtsuka et al. ................ 347/15

FOREIGN PATENT DOCUMENTS

| JP | 2-62260 | 3/1990 |
| JP | 8-79516 | 3/1996 |

* cited by examiner

*Primary Examiner*—Mark Wallerson
(74) *Attorney, Agent, or Firm*—Oblon, Spivak, McClelland, Maier & Neustadt, P.C.

(57) ABSTRACT

In a printer that enables creation of at least two variable-size dots, that is, a larger-size dot and a smaller-size dot, the technique of the present invention extracts pixels constituting the contour of a shape, for example, a letter or a figure, and allocates the smaller-size dot to the extracted contour pixels. Compared with creation of the larger-size dot, creation of the smaller-size dot in the contour pixels results in a smoother contour and effectively prevents the contour from being undesirably thickened. A favorable procedure to further improve the picture quality of a resulting printed image causes a position of creating a predetermined-size dot among the at least two variable-size dots to be shifted in a preset direction from a position of creating another dot among the at least two variable-size dots. After the extraction of the contour pixels, the procedure selects one of the at least two variable-size dots, which is to be created in each of the extracted contour pixels, based on information on a higher resolution than the printing resolution. The information on the higher resolution may be externally given in the form of image data or alternatively obtained by the image processing, such as interpolation.

17 Claims, 27 Drawing Sheets

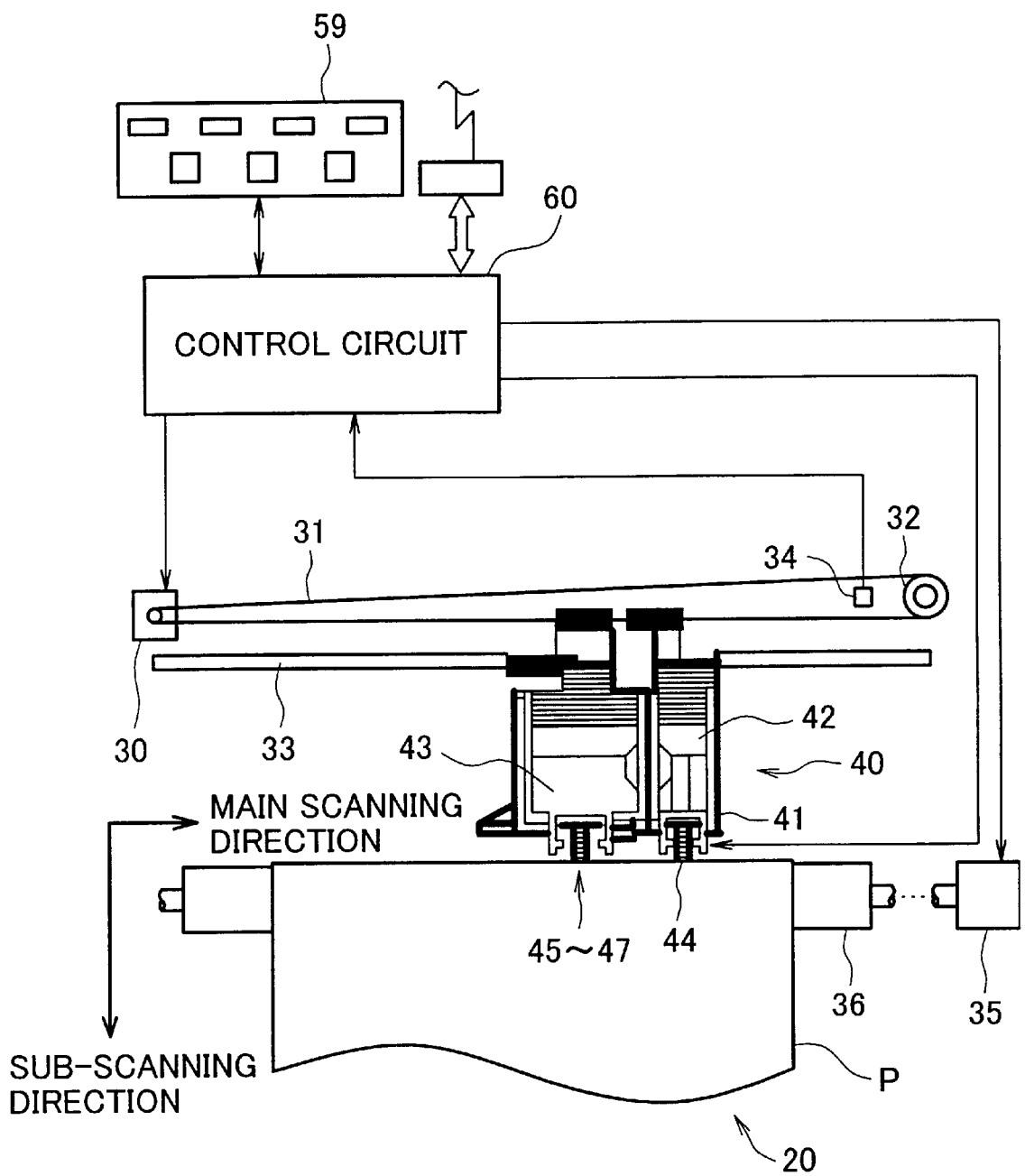

Fig.7
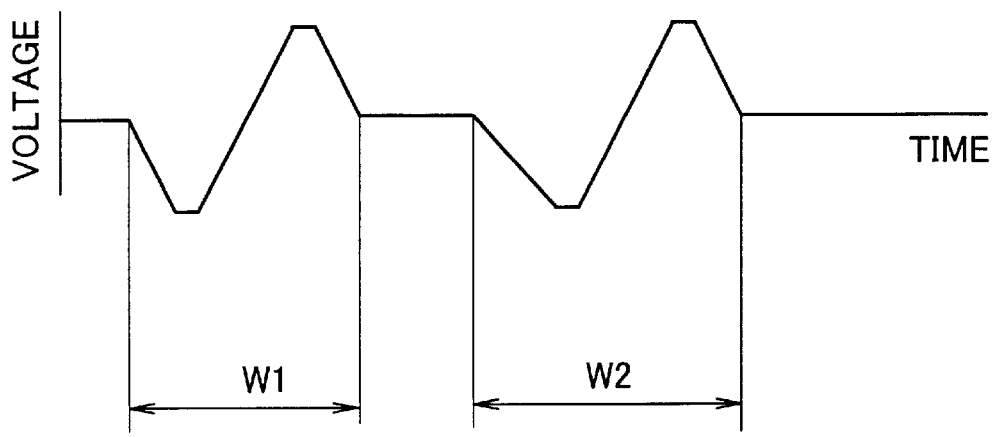
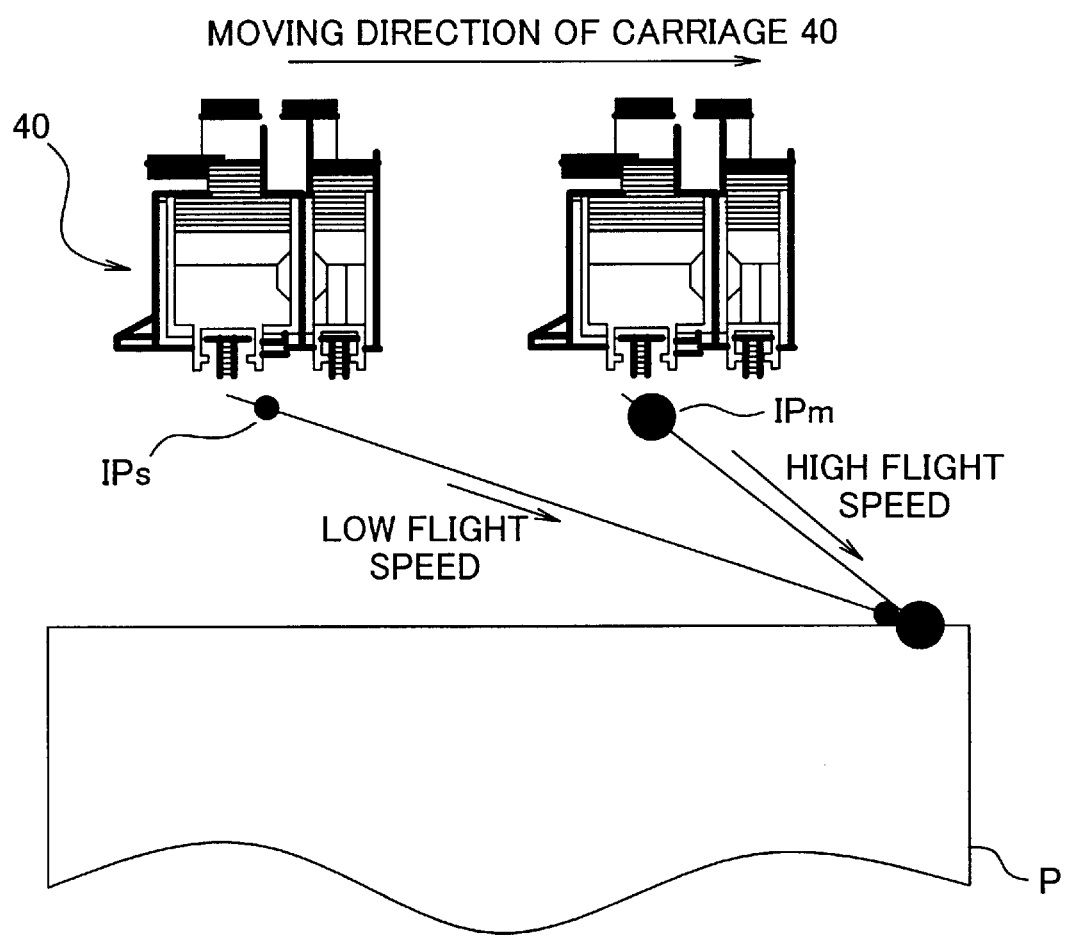

LARGE DOTS

MEDIUM DOT    SMALL DOT
      LARGE DOTS

| TARGET PIXEL | H | | | | | | | | L |
|---|---|---|---|---|---|---|---|---|---|
| FORWARD REFERENCE PIXELS | H | | | L | | | — | | |
| REARWARD REFERENCE PIXELS | H | L | — | H | L | — | H | L | — | |
| RESULTS OF DETERMINATION | 0 | 1 | 0 | 2 | 1 | 0 | 0 | 0 | 0 | 0 |

PRINTING APPARATUS, METHOD OF PRINTING, AND RECORDING MEDIUM TO ACTUALIZE THE METHOD

BACKGROUND OF THE INVENTION

1. Field of the Invention

The present invention relates to a technique that creates dots on a printing medium, so as to print a variety of images. More specifically the invention pertains to a technique that controls creation of dots on the contour of an image, so as to enhance the picture quality of the resulting image.

2. Description of the Related Art

Printing apparatuses that create ink dots on a printing medium to print an image are widely used as output devices of various images output from the computer, for example, natural images, letters, and figures. The printing apparatus divides an image into fine pixels and creates dots on the printing medium according to the tone values of the respective pixels, thereby printing the image. The technique applied for the printing apparatus determines creation or non-creation of a dot with regard to each pixel according to its tone value, in such a manner that dots are formed at a higher ratio in dark areas (where pixels have high tone values) of the printed image but formed at a lower ratio in light areas (where pixels having low tone values) of the printed image. The dots are created at the corresponding pixel positions, based on the results of the determination. The resulting printed image has a variation in brightness according to the density of dots and thus attains a wide range of tone value expression.

In the dark areas of the printed image, the control procedure determines creation of dots at a higher density. Namely dots are formed in most pixel positions in these areas. When the dots created there have a relatively small size, there is often a streak of clearance on the boundary between pixels, which is generally called banding and worsens the picture quality. The size of the dots formed on the printing medium is accordingly regulated to be greater than the interval between pixels.

Some proposed printers actively regulate the size of dots formed on the printing medium. In the case where the size of dots is not regulated, there are only two expressible levels, that is, creation or non-creation of the dot, in the respective pixels. In the case where the size of dots is regulated, on the other hand, there are a greater number of expressible levels in each pixel, which ensures the richer tone expression. The proposed technique allocates the larger-size dot to the pixels having high tone values and the smaller-size dot to the pixels having low tone values. Compared with the conventional technique that simply expresses the tone according to the density of dots, this proposed technique expands the degree of freedom in tone expression and enables a natural image having a wide range of tone values to be printed with a high quality.

These prior art printers, however, have a problem that the contour of a figure or a letter may be thickened in print. The figures and letters are generally expressed in black and have high tone values. The larger-size dot is accordingly allocated to such figures and letters. Since the size of the large dot is designed to be greater than the pixel, the printed contour is made thicker than expected. Allocation of the smaller-size dot to the contour may, however, cause the banding.

In these prior art printers, the printed figure or letter may have a relatively rough contour, which lowers the picture quality of the printed image. The dots are formed in the respective pixel positions, which are obtained by dividing the image as mentioned above. Unless the contour line coincides with the direction of alignment of pixels, the contour should be approximated by a broken line, which may result in a relatively rough contour. Increasing the number of divisions of the image to make the respective pixels smaller ensures the smooth contour. The time period required for printing the image, however, increases with an increase in number of pixels constituting the image.

SUMMARY OF THE INVENTION

The object of the present invention is thus to provide a technique that improves the picture quality of a printed image including figures or letters.

At least part of the above and the other related objects is actualized by a first printer having a print head that enables creation of at least two variable-size dots, that is, a larger-size dot and a smaller-size dot. The first printer drives the print head and carries out both main scan and sub-scan to print an image. The first printer includes: a contour pixel extraction unit that extracts contour pixels based on image data, the contour pixels representing the contour of a shape included in the image; a dot creation decision unit that determines creation or non-creation of each of the at least two variable-size dots with regard to each pixel based on the image data, and allocates the smaller-size dot to each of the contour pixels extracted by the contour pixel extraction unit; and a dot creation unit that actually creates the at least two variable-size dots, based on results of the determination and the allocation with regard to the respective pixels by the dot creation decision unit.

The present invention is also directed to a first method of printing that corresponds to the first printer. The invention accordingly provides the first method of driving a print head and carrying out both main scan and sub-scan to print an image, wherein the print head enables creation of at least two variable-size dots, that is, a larger-size dot and a smaller-size dot. The first method includes the steps of: (a) extracting contour pixels based on image data, the contour pixels representing the contour of a shape included in the image; (b) determining creation or non-creation of each of the at least two variable-size dots with regard to each pixel based on the image data, and allocating the smaller-size dot to each of the contour pixels extracted in the step (a); and (c) actually creating the at least two variable-size dots, based on results of the determination and the allocation with regard to the respective pixels in the step (b).

In the first printer and the corresponding first method, the technique of the present invention extracts contour pixels included in the image, determines creation or non-creation of each of the at least two variable-size dots with regard to each pixel based on the image data, and allocates the smaller-size dot to the extracted contour pixels. The at least two variable-size dots are formed according to the result of the determination with regard to the respective pixels. The smaller-size dot is allocated to the contour of a shape included in the image. This arrangement effectively prevents the contour from being undesirably thickened and thereby improves the picture quality of a resulting printed image.

The smaller-size dot is formed in the respective contour pixels, whereas the larger-size dot is created inside the shape. For example, in the case of printing black letters or figure, the larger-size dot is allocated to the inside of the respective letters or figure. This enables the contour of the shape to be printed clearly in deep black and effectively prevents banding from occurring even in solid areas of the figure.

In the first printer and the corresponding first method, one preferable application of the technique defines a plurality of adjoining pixels in a main scanning direction as one set, compares a tone value of each pixel included in the set with a predetermined threshold value, and extracts the contour pixels based on a result of the comparison and a preset relationship. The extraction of contour pixels according to this procedure desirably improves the picture quality of the resulting printed image.

In the first printer and the corresponding first method, another preferable application of the technique tentatively determines creation or non-creation of each of the at least two variable-size dots in each pixel based on the image data, stores a result of the tentative determination, rewrites the result of the tentative determination to create the smaller-size dot in the contour pixels, and settles the rewritten result as a result of the determination by the dot creation decision unit. The at least two variable-size dots are formed according to the result of the determination thus obtained, and the smaller-size dot is formed in the respective contour pixels. This arrangement favorably improves the picture quality of the resulting printed image.

At least part of the above and the other related objects is also actualized by a second printer having a print head that enables creation of at least two variable-size dots. The second printer drives the print head and carries out both main scan and sub-scan to print an image. The second printer includes: a resolution reduction unit that collects a plurality of adjoining pixels among all the pixels constituting the image into one large pixel based on a predetermined relationship, and expresses the image with the large pixels; a contour pixel extraction unit that extracts contour large pixels based on image data, the contour large pixels representing the contour of a shape included in the image; a dot creation decision unit that determines creation or non-creation of each of the at least two variable-size dots with regard to each large pixel based on the image data, and selects one of the at least two variable-size dots, which is to be created in each of the extracted contour large pixels, based on the image data with regard to the plurality of adjoining pixels collected into the contour large pixel; and a dot creation unit that actually creates the at least two variable-size dots, based on results of the determination and the selection with regard to the respective large pixels by the dot creation decision unit.

The present invention is further directed to a second method of printing that corresponds to the second printer. The invention accordingly provides the second method of driving a print head and carrying out both main scan and sub-scan to print an image, wherein the print head enables creation of at least two variable-size dots. The second method includes the steps of: (a) collecting a plurality of adjoining pixels among all the pixels constituting the image into one large pixel based on a predetermined relationship, and expressing the image with the large pixels; (b) extracting contour large pixels based on image data, the contour large pixels representing the contour of a shape included in the image; (c) determining creation or non-creation of each of the at least two variable-size dots with regard to each large pixel based on the image data, and selecting one of the at least two variable-size dots, which is to be created in each of the extracted contour large pixels, based on the image data with regard to the plurality of adjoining pixels collected into the contour large pixel; and (d) actually creating the at least two variable-size dots, based on results of the determination and the selection with regard to the respective large pixels in the step (c).

In the second printer and the corresponding second method, the technique of the present invention collects a plurality of adjoining pixels among all the pixels constituting the image into one large pixel based on a predetermined relationship, expresses the image with the large pixels, and extracts contour large pixels from the large pixels constituting the image. The technique subsequently determines the dot to be created in each large pixel based on image data, and selects one of the at least two variable-size dots, which is to be created in each of the extracted contour large pixels, based on the image data with regard to the plurality of adjoining pixels collected into the contour large pixel. The respective dots are then formed according to the results of the determination and the selection obtained for the respective large pixels. This arrangement enables the contour of a shape included in the image to be printed with adequate dots, on which information on the plurality of adjoining pixels collected to each large pixel is reflected. This gives a smooth contour and improves the printing quality.

The technique of the second printer and the corresponding second method prints the large pixels constituting the contour with adequate-size dots, while not increasing the number of dots required for printing the image. This arrangement thus ensures the high-quality printing without increasing the time period required for printing.

In accordance with one preferable application of the second printer and the corresponding second method, a position of creating a predetermined-size dot among the at least two variable-size dots is shifted in a preset direction from a position of creating another dot among the at least two variable-size dots. The preferable application of the technique analyzes a tone value distribution of the plurality of adjoining pixels collected into each contour large pixel, and determines that the predetermined-size dot is to be created in the contour large pixel when the tone value distribution is deviated in a direction substantially identical with the preset direction. The respective dots are created according to the results of the determination. This arrangement enables the dots to be formed at desirable positions and constitute the contour of the printed image. This gives a smoother contour and improves the printing quality. This arrangement of the printer and the method also prints the large pixels constituting the contour included in the printed image with adequate-size dots, while not increasing the number of dots required for printing the image. This arrangement thus ensures the high-quality printing without increasing the time period required for printing.

In accordance with another preferable application of the second printer and the corresponding second method, a position of creating a predetermined-size dot among the at least two variable-size dots is shifted in the main scanning direction from a position of creating another dot among the at least two variable-size dots. The preferable application of the technique analyzes a tone value distribution of the plurality of adjoining pixels collected into each contour large pixel, and determines that the predetermined-size dot is to be created in the contour large pixel when the tone value distribution is deviated in a direction substantially identical with the main scanning direction. This arrangement enables the dots to be formed at desirable positions and constitute the contour of the printed image. This gives a smoother contour and improves the printing quality.

In the second printer and the corresponding second method, one preferable application of the technique tentatively determines creation or non-creation of each of the at least two variable-size dots in each large pixel based on the image data, stores a result of the tentative determination, selects one of the at least two variable-size dots, which is to be created in each contour large pixel, based on the image data with regard to the plurality of adjoining pixels collected into the contour large pixel, rewrites the result of the tentative determination in order to create the selected dot in each contour large pixel, and settles the rewritten result as a result of the determination by the dot creation decision unit. The respective dots are formed according to the results of the determination and the selection thus obtained. This arrangement enables adequate dots, on which information on the plurality of adjoining pixels collected to each large pixel is reflected, to be created in the contour pixels. This gives a smooth contour and improves the printing quality.

At least part of the above and the other related objects is also actualized by a third printer having a print head that enables creation of at least two variable-size dots. The third printer drives the print head and carries out both main scan and sub-scan to print an image. The third printer includes: a contour pixel extraction unit that extracts contour pixels based on image data, the contour pixels representing the contour of a shape included in the image; a dot creation decision unit that determines creation or non-creation of each of the at least two variable-size dots with regard to each pixel based on the image data, the dot creation decision unit dividing each of the contour pixels into a plurality of adjoining small pixels and selecting one of the at least two variable-size dots, which is to be created in each of the contour pixels, based on tone values of the respective small pixels that are specified according to a predetermined relationship; and a dot creation unit that actually creates the at least two variable-size dots, based on results of the determination and the selection with regard to the respective pixels by the dot creation decision unit.

The present invention is also directed to a third method of printing that corresponds to the third printer. The invention accordingly provides the third method of driving a print head and carrying out both main scan and sub-scan to print an image, wherein the print head enables creation of at least two variable-size dots. The third method includes the steps of: (a) extracting contour pixels based on image data, the contour pixels representing the contour of a shape included in the image; (b) determining creation or non-creation of each of the at least two variable-size dots with regard to each pixel based on the image data, dividing each of the contour pixels into a plurality of adjoining small pixels, and selecting one of the at least two variable-size dots, which is to be created in each of the contour pixels, based on tone values of the respective small pixels that are specified according to a predetermined relationship; and (c) actually creating the at least two variable-size dots, based on results of the determination and the selection with regard to the respective pixels in the step (b).

In the third printer and the corresponding third method, the technique of the present invention extracts contour pixels based on image data, determines creation or non-creation of each of the at least two variable-size dots with regard to each pixel based on the image data, divides each of the contour pixels into a plurality of adjoining small pixels, and selects one of the at least two variable-size dots, which is to be created in each of the contour pixels, based on tone values of the respective small pixels that are specified according to a predetermined relationship. The respective dots are formed on a printing medium according to the results of the determination and the selection thus obtained. This arrangement enables adequate dots, on which information on the adjoining small pixels is reflected, to be created on the contour. This gives a smoother contour and improves the printing quality.

The technique of the third printer and the corresponding third method prints the pixels constituting the contour with adequate-size dots, while not increasing the number of dots required for printing the image. This arrangement thus ensures the high-quality printing without increasing the time period required for printing.

In accordance with one preferable application of the third printer and the corresponding third method, a position of creating a predetermined-size dot among the at least two variable-size dots is shifted in a preset direction from a position of creating another dot among the at least two variable-size dots. The preferable application of the technique analyzes a tone value distribution with regard to the plurality of adjoining small pixels, which are obtained by dividing each contour pixel, and determines that the predetermined-size dot is to be created in the contour pixel when the tone value distribution is deviated in a direction substantially identical with the preset direction. This arrangement enables the dots to be formed at desirable positions and constitute the contour of the printed image. This gives a smoother contour and improves the printing quality. This arrangement of the printer and the method does not increase the number of dots required for printing the image. This arrangement thus ensures the high-quality printing without increasing the time period required for printing.

In accordance with another preferable application of the third printer and the corresponding third method, a position of creating a predetermined-size dot among the at least two variable-size dots is shifted in a main scanning direction from a position of creating another dot among the at least two variable-size dots. The preferable application of the technique analyzes a tone value distribution with regard to the plurality of adjoining small pixels, which are obtained by dividing each contour pixel in the main scanning direction, and determines that the predetermined-size dot is to be created in the contour pixel when the tone value distribution is deviated in a direction substantially identical with the main scanning direction. This arrangement enables the dots to be formed at desirable positions and constitute the contour of the printed image. This gives a smoother contour and improves the printing quality.

In the third printer and the corresponding third method, one preferable application of the technique tentatively determines creation or non-creation of each of the at least two variable-size dots in each pixel based on the image data, stores a result of the tentative determination, selects one of the at least two variable-size dots, which is to be created in each contour pixel, based on the tone values of the respective small pixels that are specified according to the predetermined relationship, rewrites the result of the tentative determination in order to create the selected dot in each contour pixel, and settles the rewritten result as a result of the determination by the dot creation decision unit. The respective dots are formed according to the results of the determination and the selection thus obtained. This arrangement enables adequate dots, on which information on the adjoining small pixels is reflected, to be created on the contour. This gives a smoother contour and improves the printing quality.

The first through the third methods discussed above may be actualized under the control of a computer included in a printing apparatus that utilizes a print head enabling creation of at least two variable-size dots. Another possible application of the present invention is thus a recording medium, on which a program for actualizing the respective functions discussed above is recorded in a computer readable manner.

The present invention is directed to a first recording medium, which corresponds to the first printer and the first method discussed above. The invention accordingly provides the first recording medium, on which a program is recorded in a computer readable manner. The program is used in a printer that enables creation of at least two variable-size dots, that is, a larger-size dot and a smaller-size dot. The program is activated to carry out a predetermined operation for image data representing the image, in order to determine creation or non-creation of each of the at least two variable-size dots with regard to each pixel. The program includes: a program code that causes a computer to extract contour pixels based on the image data, the contour pixels representing the contour of a shape included in the image; and a program code that causes the computer to determine creation or non-creation of each of the at least two variable-size dots with regard to each pixel based on the image data, and to allocate the smaller-size dot to each of the contour pixels.

The present invention is further directed to a second recording medium, which corresponds to the second printer and the second method discussed above. The invention accordingly provides the second recording medium, on which a program is recorded in a computer readable manner. The program is used in a printer that enables creation of at least two variable-size dots. The program is activated to carry out a predetermined operation for image data representing the image, in order to determine creation or non-creation of each of the at least two variable-size dots with regard to each pixel. The program includes: a program code that causes a computer to collect a plurality of adjoining pixels among all the pixels constituting the image into one large pixel based on a predetermined relationship, and to express the image with the large pixels; a program code that causes the computer to extract contour large pixels based on image data, the contour large pixels representing the contour of a shape included in the image; and a program code that causes the computer to determine creation or non-creation of each of the at least two variable-size dots with regard to each large pixel based on the image data, and to select one of the at least two variable-size dots, which is to be created in each of the extracted contour large pixels, based on the image data with regard to the plurality of adjoining pixels collected into the contour large pixel.

The present invention is also directed to a third recording medium, which corresponds to the third printer and the third method discussed above. The invention accordingly provides the third recording medium, on which a program is recorded in a computer readable manner. The program is used in a printer that enables creation of at least two variable-size dots. The program is activated to carry out a predetermined operation for image data representing the image, in order to determine creation or non-creation of each of the at least two variable-size dots with regard to each pixel. The program includes: a program code that causes a computer to extract contour pixels based on image data, the contour pixels representing the contour of a shape included in the image; and a program code that causes the computer to determine creation or non-creation of each of the at least two variable-size dots with regard to each pixel based on the image data, to divide each of the contour pixels into a plurality of adjoining small pixels, and to select one of the at least two variable-size dots, which is to be created in each of the contour pixels, based on tone values of the respective small pixels that are specified according to a predetermined relationship.

The computer reads the program recorded on one of the first through the third recording media and controls the printer, thereby improving the picture quality on the contour of the resulting printed image.

These and other objects, features, aspects, and advantages of the present invention will become more apparent from the following detailed description of the preferred embodiment with the accompanying drawings.

BRIEF DESCRIPTION OF THE DRAWINGS

FIG. 3 schematically illustrates the structure of a color printer included in the printing apparatus of the embodiment;

FIG. 7 shows driving waveforms of the nozzle and dots created in response to the driving waveforms in the printer of the embodiment;

DESCRIPTION OF THE PREFERRED EMBODIMENT

1. Structure of Apparatus

Figure 1:
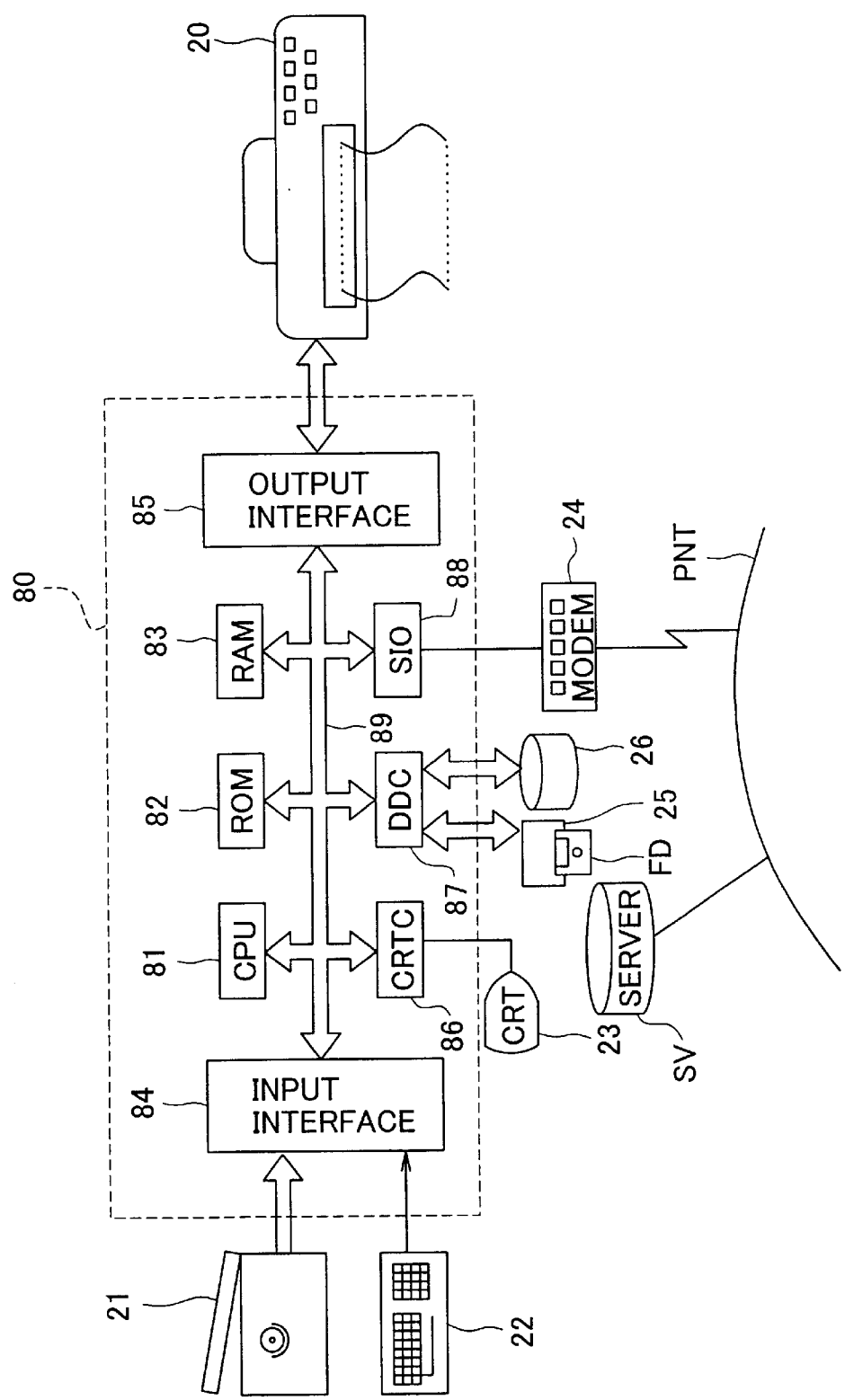
FIG. 1 is a block diagram schematically illustrating the structure of a printing apparatus in one embodiment according to the present invention.
Figure 2:
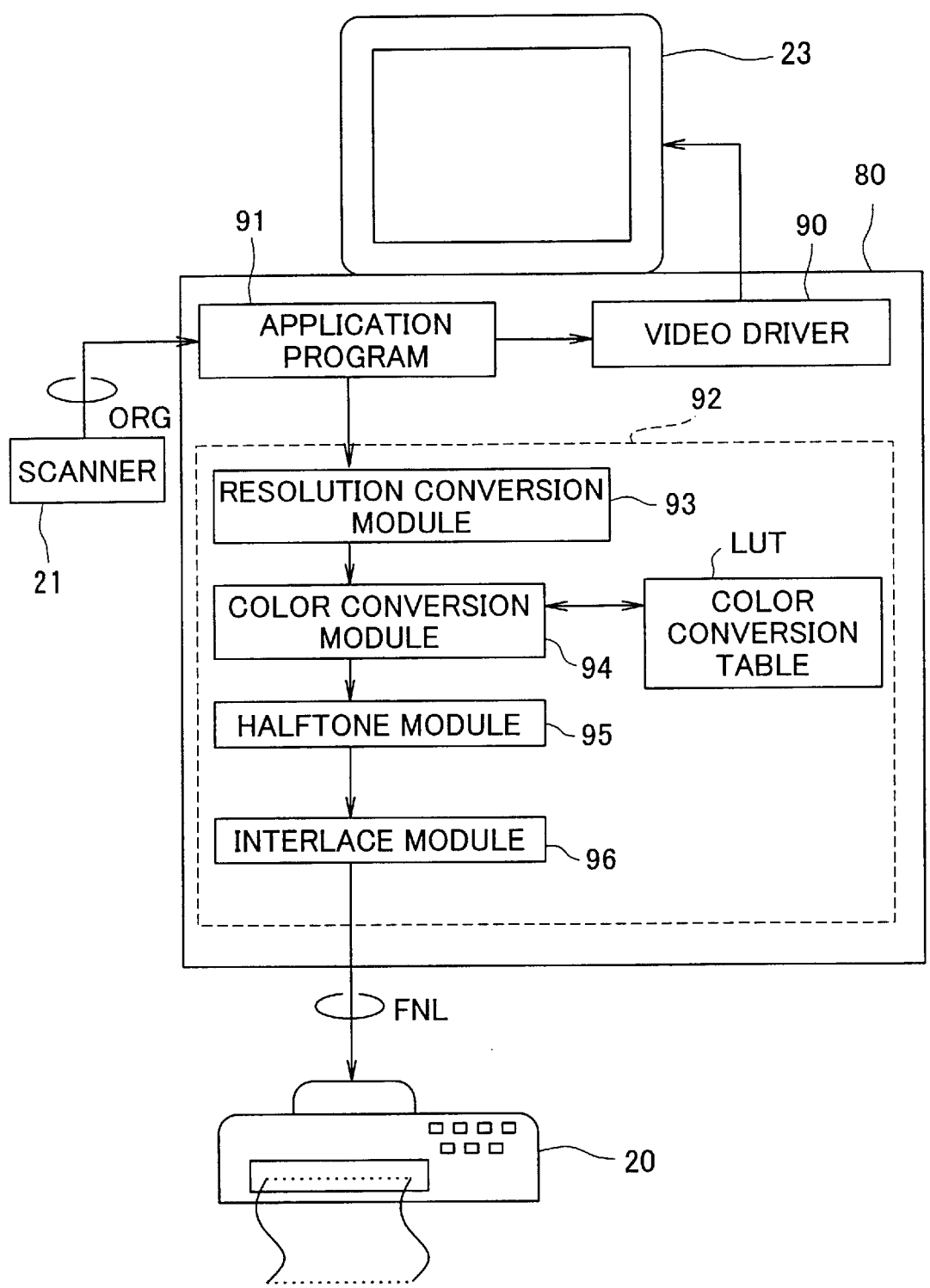
FIG. 2 is a block diagram illustrating a software configuration of the printing apparatus of the embodiment.

FIG. 1 is a block diagram schematically illustrating the structure of a printing apparatus in one embodiment according to the present invention. FIG. 2 is a block diagram illustrating a software configuration of the printing apparatus of the embodiment. The printing apparatus includes a computer 80 connected to a color printer 20 and a color scanner 21. The computer 80 reads and executes predetermined programs to function, in combination with the color printer 20 and the color scanner 21, as the printing apparatus as a whole. The color scanner 21 converts a color original, that is, an object to be printed, into color image data ORG, which are in a processible form by the computer 80 and input into the computer 80. The computer 80 carries out required image processing and further converts the color image data ORG into image data FNL, which are in a printable form by the printer 20 and input into the color printer 20. The image data processible by the computer 80 include those representing images read by the color scanner 21 with or without subsequent processing, as well as those representing images generated by a variety of application programs 91 on the computer 80. The color printer 20 creates dots of various color inks on a sheet of printing paper based on the input image data FNL. The series of this procedure enables a resulting color image corresponding to the color image data output from the computer 80 to be printed on printing paper.

The computer 80 includes a CPU 81 that carries out a variety of operations, a ROM 82, a RAM 83, an input interface 84, an output interface 85, a CRT controller (CRTC) 86, a disk controller (DDC) 87, and a serial input-output interface (SIO) 88, which are mutually connected via a bus 89 to allow transmission of data. The CRTC 86 controls output of signals to a color display CRT 23. The DDC 87 controls data transmission to and from a flexible disk drive 25, a hard disk 26, and a CD-ROM drive (not shown). A variety of programs loaded to the RAM 83 and executed by the CPU 81 and a variety of programs provided in the form of device drivers are stored in the ROM 82 and the hard disk 26. Connection of the SIO 88 with a public telephone network PNT via a modem 24 enables required data and programs to be downloaded to the hard disk 26 from a serer SV on an external network.

A supply of power to the computer 80 activates the operating system stored in the ROM 82 and the hard disk 26 and a variety of application programs 91 under the control of the operating system.

The color printer 20 of this embodiment is a color ink jet printer that ejects four different color inks, that is, cyan, magenta, yellow, and black inks, on a sheet of printing paper and thereby prints a color image. The color printer may alternatively use six color inks including light cyan and light magenta inks, instead of the four color inks. The principle of the present invention is, however, not restricted to color printers that eject inks to create dots, but is also applicable to thermal transfer color printers that create dots, for example, by a sublimation or fusion technique. The ink jet printer applied in this embodiment uses piezoelectric elements PE to eject ink. The printer may, however, have a print head that ejects ink by another technique, for example, by means of bubbles that are generated in an ink conduit through a supply of electricity to a heater disposed in the ink conduit.

The color printer 20 of the embodiment is also constructed as a variable dot printer that enables variable-size dots, that is, a large-size dot, a medium-size dot, and a small-size dot, to be created with regard to each color. The variable dot printer varies the size of dots created, so as to enable expression of multilevel tones in the respective dots and print a resulting image with rich tone expression. The color printer 20 of this embodiment applies a certain technique of ink ejection to enable three variable-size dots to be created from a single ink ejection nozzle. The technique of ink ejection will be described in detail later. As clearly understood from the explanation of the technique of ink ejection, the variable dot is not restricted to the three possible sizes, but may have a greater number of possible sizes according to the requirement.

Referring to FIG. 2, in the computer 80, all the application programs 91 work under the control of the operating system. A video driver 90 and a printer driver 92 are incorporated in the operating system, and image data output from each application program 91 are output to the color printer 20 via the printer driver 92. The application program 91 that processes an input image, for example, by retouch causes the input image taken from the color scanner 21 to be displayed on the CRT 23 via the video driver 90. This enables the user to carry out the required image processing while checking the displayed image on the CRT 23.

When the application program 91 issues a print instruction, the printer driver 92 of the computer 80 receives image data from the application program 91 and carries out predetermined image processing to convert the input image data to image data FNL that are printable by the printer 20. As shown conceptually in FIG. 2, the image processing carried out in the printer driver 92 is mainly classified into four modules, that is, a resolution conversion module 93, a color conversion module 94, a halftone module 95, and an interlace module 96. The details of the image processing carried out by each module will be discussed later. The image data received by the printer driver 92 are subjected to the image processing performed by the respective modules and are output as the final image data FNL to the color printer 20. The color printer 20 of this embodiment does not carry out the image processing but simply creates dots according to the input image data FNL. A modified application may, however, cause the color printer 20 to carry out part of the image processing.

FIG. 3 schematically illustrates the structure of the color printer 20 in this embodiment. The color printer 20 has a mechanism of driving a print head 41 mounted on a carriage 40 to implement ink ejection and dot creation, a mechanism of moving the carriage 40 forward and backward along an axis of a platen 36 by means of a carriage motor 30, a mechanism of feeding a sheet of printing paper P by means of a sheet feed motor 35, and a control circuit 60. The mechanism of reciprocating the carriage 40 along the axis of the platen 36 includes a sliding shaft 33 that slidably holds the carriage 40 that is arranged in parallel with the axis of the platen 36, a pulley 32 that is linked with the carriage motor 30 via an endless drive belt 31 spanned therebetween, and a position sensor 34 that detects the position of the origin of the carriage 40. The mechanism of feeding the printing paper P includes the platen 36, the sheet feed motor 35 that rotates the platen 36, a sheet-feed assist roller (not shown), and a gear train (not shown) that transmits the rotation of the sheet feed motor 35 to the platen 36 and the sheet-feed assist roller. The control circuit 60 transmits signals to and from a control panel 59 of the printer 20 and adequately controls the operations of the sheet feed motor 35, the carriage motor 30, and the print head 41. The sheet of printing paper P fed to the color printer 20 is held between the platen 36 and the sheet-feed assist roller and fed by a predetermined length according to a rotational angle of the platen 36.

A black ink cartridge 42 in which black (K) ink is kept and a color ink cartridge 43 in which cyan (C), magenta (M), and yellow (Y) inks are kept are detachably attached to the carriage 40. The combination of these inks may be changed; for example, the black (K) and yellow (Y) inks are kept in the same ink cartridge. The arrangement of keeping a plurality of inks into one ink cartridge desirably reduces the total space required for the ink cartridges. The print head 41 disposed on the lower portion of the carriage 40 has ink ejection heads 44, 45, 46, and 47 that respectively correspond to the K, C, M, and Y inks. Ink supply conduits (not shown) are formed for the respective inks in the bottom of the carriage 40. When the ink cartridges 42 and 43 are attached to the carriage 40, the respective inks kept in the ink cartridges 42 and 43 are supplied to the ink ejection heads 44 through 47 via the corresponding ink supply conduits. The supply of ink fed to each of the ink ejection heads 44 through 47 is ejected from the print head 41 to create dots on the printing paper P according to the technique discussed below.

Figure 4A:
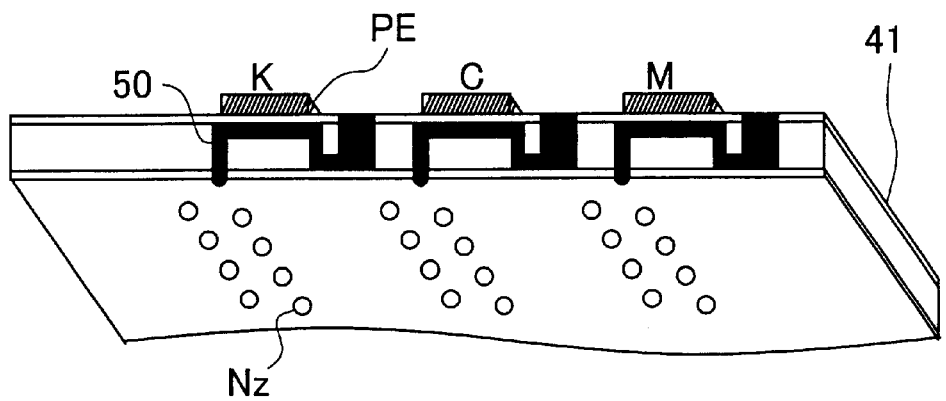
FIG. 4 shows the principle of creating dots in the printer of the embodiment.
Figure 4B:
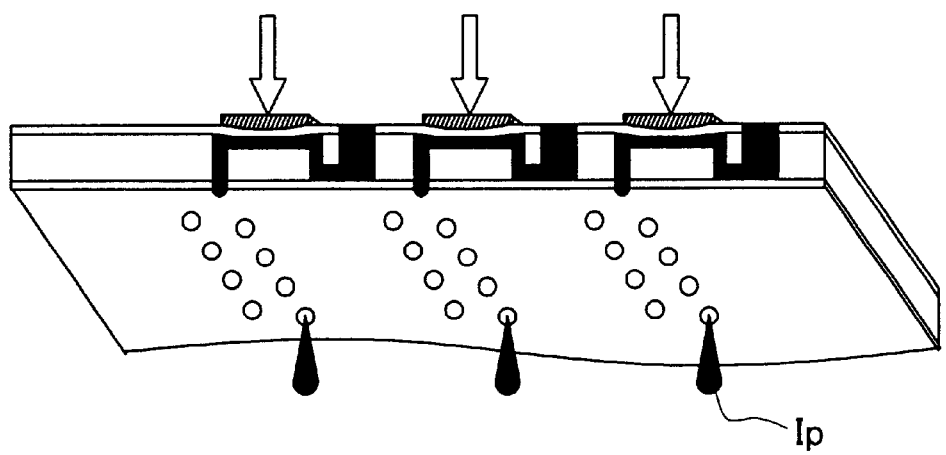

FIG. 4A shows the internal structure of the print head 41. Forty eight nozzles Nz are formed in each of the ink ejection heads 44 through 47 corresponding to the respective colors. Each nozzle has an ink conduit 50 and a piezoelectric element PE arranged on the ink conduit 50. As is known by those skilled in the art, the piezoelectric element PE deforms its crystal structure by application of a voltage and implements an extremely high-speed conversion of electrical energy into mechanical energy. In this embodiment, when a preset voltage is applied between electrodes on either end of the piezoelectric elements PE for a predetermined time period, the piezoelectric element PE is expanded for the predetermined time period to deform one side wall of the ink conduit 50 as shown in FIG. 4B. The volume of the ink conduit 50 is reduced according to the expansion of the piezoelectric element PE. A certain amount of ink corresponding to the reduction is ejected as an ink particle Ip from the nozzle Nz at a high speed. The ink particle Ip soaks into the printing paper P set on the platen 36 and creates a dot on the printing paper P.

Figure 5:
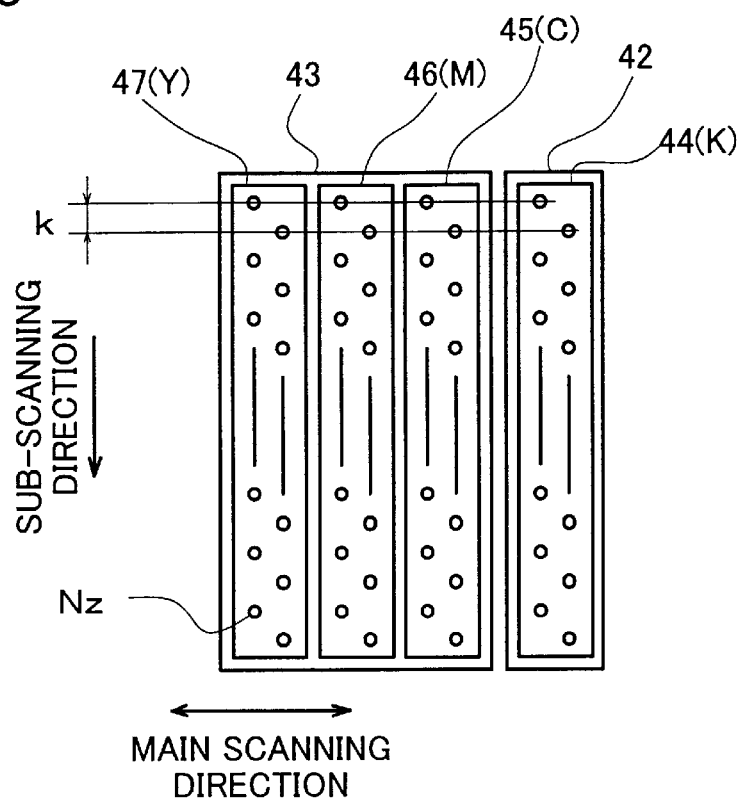
FIG. 5 shows an arrangement of nozzles on a print head in the printer of the embodiment.

FIG. 5 shows an arrangement of ink jet nozzles Nz on the ink ejection heads 44 through 47. Four sets of nozzle arrays, from which the respective color inks are ejected, are formed in the bottom faces of the respective ink ejection heads 44 through 47. Each set of nozzle array includes forty eight nozzles Nz arranged in zigzag at a preset nozzle pitch k. The forty eight nozzles Nz included in each nozzle array may be arranged in alignment, instead of in zigzag. The zigzag arrangement shown in FIG. 5, however, has an advantage that the nozzle array can be designed to have a small nozzle pitch k.

Referring to FIG. 5, the ink ejection heads 44 through 47 of the respective colors are shifted in position in the moving direction of the carriage 40. Since the nozzles included in each ink ejection head are arranged in zigzag, the nozzles are also shifted in position in the moving direction of the carriage 40. The control circuit 60 of the color printer 20 drives the respective ink ejection heads 44 through 47 at suitable head drive timings by taking into account a positional difference of the nozzles in the course of moving the carriage 40 and driving the nozzles.

Figure 6:
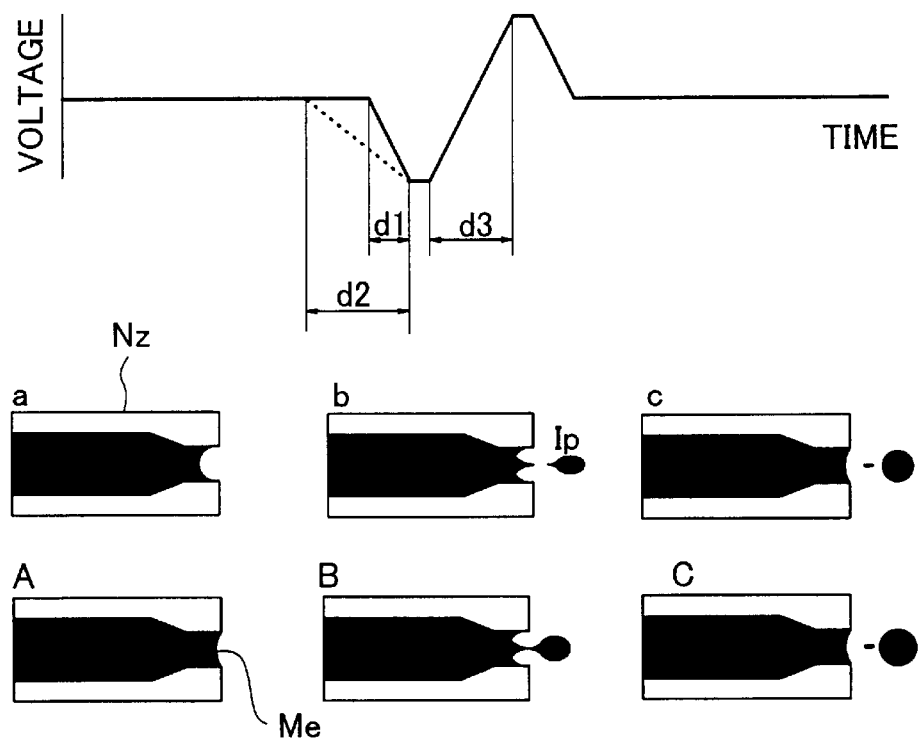
FIG. 6 shows the principle of creating variable-size dots in the printer of the embodiment.

The color printer 20 of this embodiment has the nozzles Nz of a fixed diameter as shown in FIG. 5. Three variable-size dots can be formed with the nozzles Nz of the fixed diameter. The following describes the principle of such dot creation technique. FIG. 6 shows the relationship between the driving waveform of the nozzle Nz and the size of the ink particle Ip ejected from the nozzle Nz. The driving waveform shown by the broken line in FIG. 6 is used to create standard-size dots. Application of a voltage lower than a reference voltage to the piezoelectric element PE in a division d2 deforms the piezoelectric element PE in the direction of increasing the cross section of the ink conduit 50, contrary to the case discussed previously with the drawing of FIG. 4. Since there is a limit in ink supply speed to the nozzle, the quantity of ink supply has an insufficiency relative to the expansion of the ink conduit 50. As shown in a state A of FIG. 6, an ink interface Me is thus slightly concaved inward the nozzle Nz. When the driving waveform shown by the solid line in FIG. 6 is used to abruptly lower the voltage in a division d1, on the other hand, the quantity of ink supply has a further insufficiency and the ink interface Me is more significantly concaved inward the nozzle Nz as shown in a state 'a' of FIG. 6, compared with the state A.

Subsequent application of a high voltage to the piezoelectric element PE in a division d3 reduces the sectional area of the ink conduit 50 and compresses the ink in the ink conduit 50, thereby causing an ink droplet to be ejected from the ink nozzle Nz. The size of the ink droplet depends upon the degree of insufficiency of the ink supply quantity. As shown in states B and C of FIG. 6, a large ink droplet is ejected when the ink interface Me is only slightly concaved inward (state A). As shown in states 'b' and 'c' of FIG. 6, on the other hand, a small ink droplet is ejected when the ink interface Me is significantly concaved inward (state 'a'). The size of the dot to be created can thus be varied by changing the rate of decrease in driving voltage (see the divisions d1 and d2).

The color printer 20 successively outputs two different driving waveforms W1 and W2 as shown in FIG. 7. According to the variation in rate of decrease in driving voltage, the driving waveforms W1 and W2 respectively correspond to a smaller ink droplet Ips and a larger ink droplet Ipm. By way of example, it is assumed that the color printer 20 outputs the driving waveform W1 and the driving waveform W2 in this sequence while moving the carriage 40 in a main scanning direction. The smaller ink droplet Ips ejected in response to the driving waveform W1 has a relatively low flight speed, whereas the larger ink droplet Ipm ejected in response to the driving waveform W2 has a relatively high flight speed. The smaller ink droplet Ips accordingly requires a longer time to hit the printing paper P. Namely, compared with the larger ink droplet Ipm, the smaller ink droplet Ips has a greater moving distance in the main scanning direction from the position where the ink droplet is ejected from the nozzle Nz to the position where the ink droplet hits the printing paper P. Regulating the timings of the driving waveforms W1 and W2 enables the smaller ink droplet Ips and the larger ink droplet to be ejected on an identical pixel. In the color printer 20 of this embodiment, the timings of the two driving waveforms W1 and W2 are regulated to make the hitting positions of the smaller ink droplet Ips and the larger ink droplet Ipm shifted a little in the main scanning direction when being ejected in an identical pixel as shown in FIG. 7.

The color printer 20 of this embodiment supplies only the driving waveform W1 to the piezoelectric element PE to create small dots, supplies only the driving waveform W2 to the piezoelectric element PE to create medium dots, and supplies both the driving waveforms W1 and W2 to cause two variable-size ink droplets, that is, the smaller ink droplet and the larger ink droplet, to be ejected on an identical pixel and thereby create large dots. Increasing the number of different driving waveforms enables a greater number of variable size dots to be created.

Figure 8:
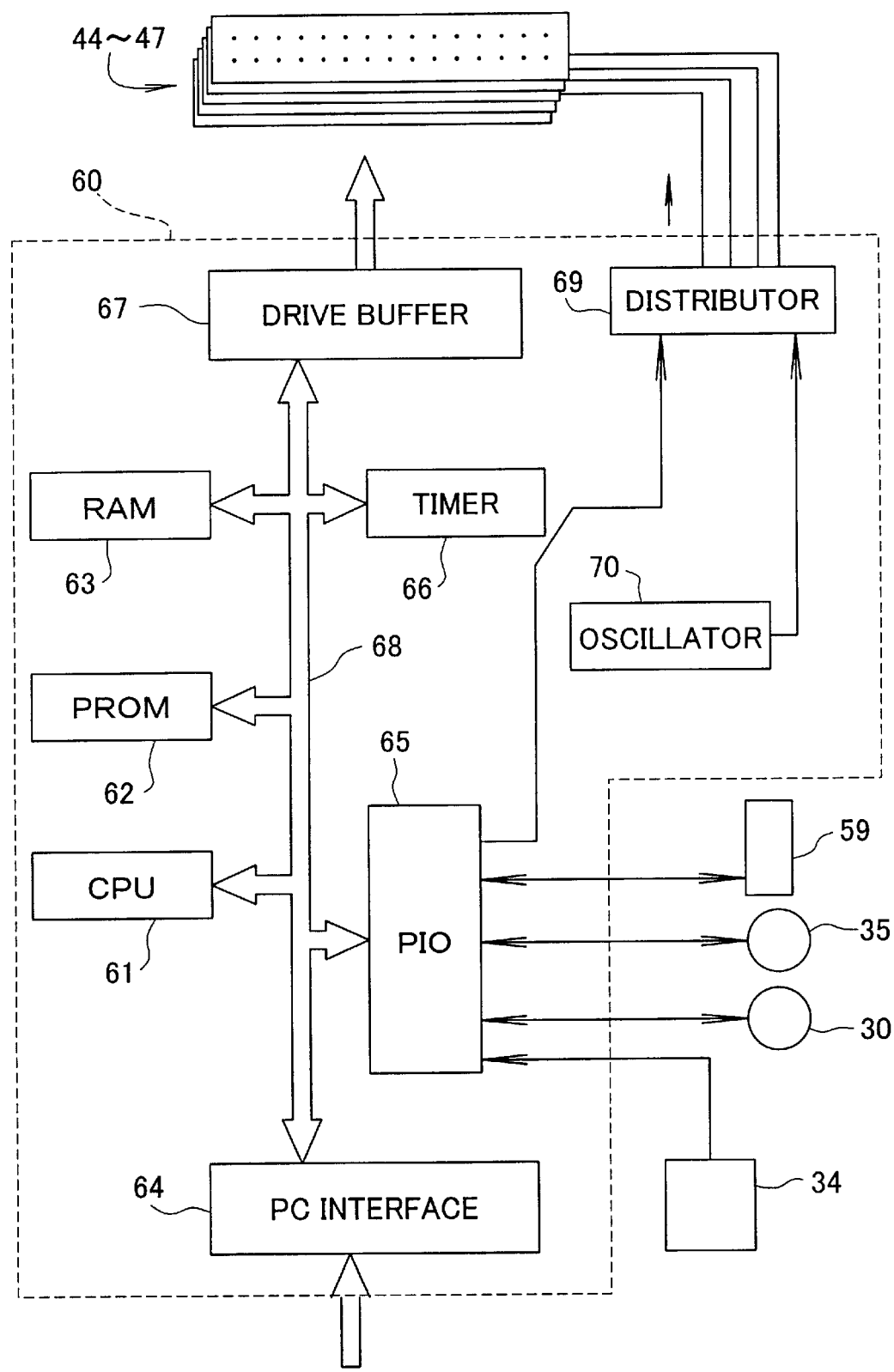
FIG. 8 shows the internal structure of a control circuit included in the printer of the embodiment.

FIG. 8 illustrates the internal structure of the control circuit 60 in the color printer 20. The control circuit 60 includes a CPU 61, a PROM 62, a RAM 63, a PC interface 64 that transmits data to and from the computer 80, a peripheral equipment input-output unit (PIO) 65 that transmits data to and from the sheet feed motor 35, the carriage motor 30, and other elements, a timer 66, and a drive buffer 67. The drive buffer 67 functions to supply dot on/off signals to the ink ejection heads 44 through 47. These elements are mutually connected via a bus 68 to allow transmission of data. The control circuit 60 further includes an oscillator 70 that outputs driving waveforms at selected frequencies and a distributor 69 that distributes the outputs from the oscillator 70 to the ink ejection heads 44 through 47 at specified timings.

The control circuit 60 constructed as shown in FIG. 8 receives the image data FNL output from the computer 80 and temporarily stores the dot on/off signals in the RAM 63. The CPU 61 outputs dot data to the drive buffer 67 at a preset timing synchronously with the operations of the sheet feed motor 35 and the carriage motor 30.

Figure 9:
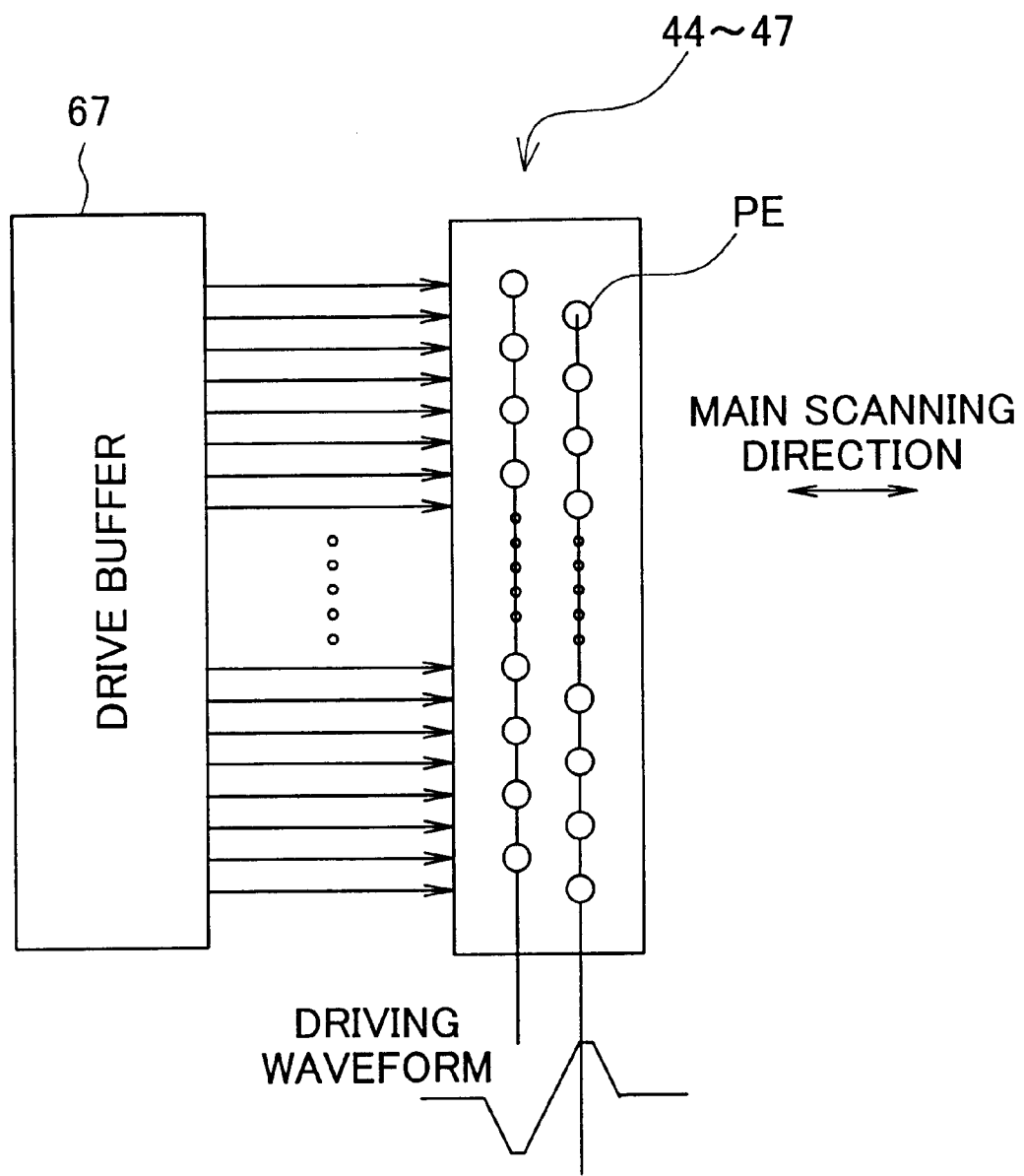
FIG. 9 shows a process of creating dots based on data output from a drive buffer to the print head.

The following describes a mechanism of creating dots in response to the dot on/off signals output from the CPU 61 to the drive buffer 67. FIG. 9 illustrates connection of one nozzle array in the ink ejection heads 44 through 47. The nozzle array in each of the ink ejection heads 44 through 47 is included in a circuit, in which the drive buffer 67 works as the source and the distributor 69 as the sink. The piezoelectric elements PE corresponding to the nozzles Nz included in the nozzle array have one electrodes respectively connected to each output terminal of the drive buffer 67 and the other electrodes collectively connected to the output terminal of the distributor 69. The driving waveforms of the oscillator 70 are output from the distributor 69 as shown in FIG. 9. When the CPU 61 outputs the dot on/off signals of the respective nozzles to the drive buffer 67, only the piezoelectric elements PE receiving the ON signal are driven in response to the output driving waveforms. The ink particles Ip are thus ejected from the nozzles corresponding to the piezoelectric elements PE that have received the ON signal from the drive buffer 67.

The color printer 20 having the hardware configuration discussed above drives the carriage motor 30 to move the ink ejection heads 44 through 47 of the respective colors relative to the printing paper P in the main scanning direction, and drives the sheet feed motor 35 to shift the printing paper P in a sub-scanning direction. Under the control of the control circuit 60, the print head 41 is driven at adequate timings while the main scans and sub-scans of the carriage 40 are repeated. The color printer 20 accordingly prints a color image on the printing paper P.

2. Outline of Image Processing

Figure 10:
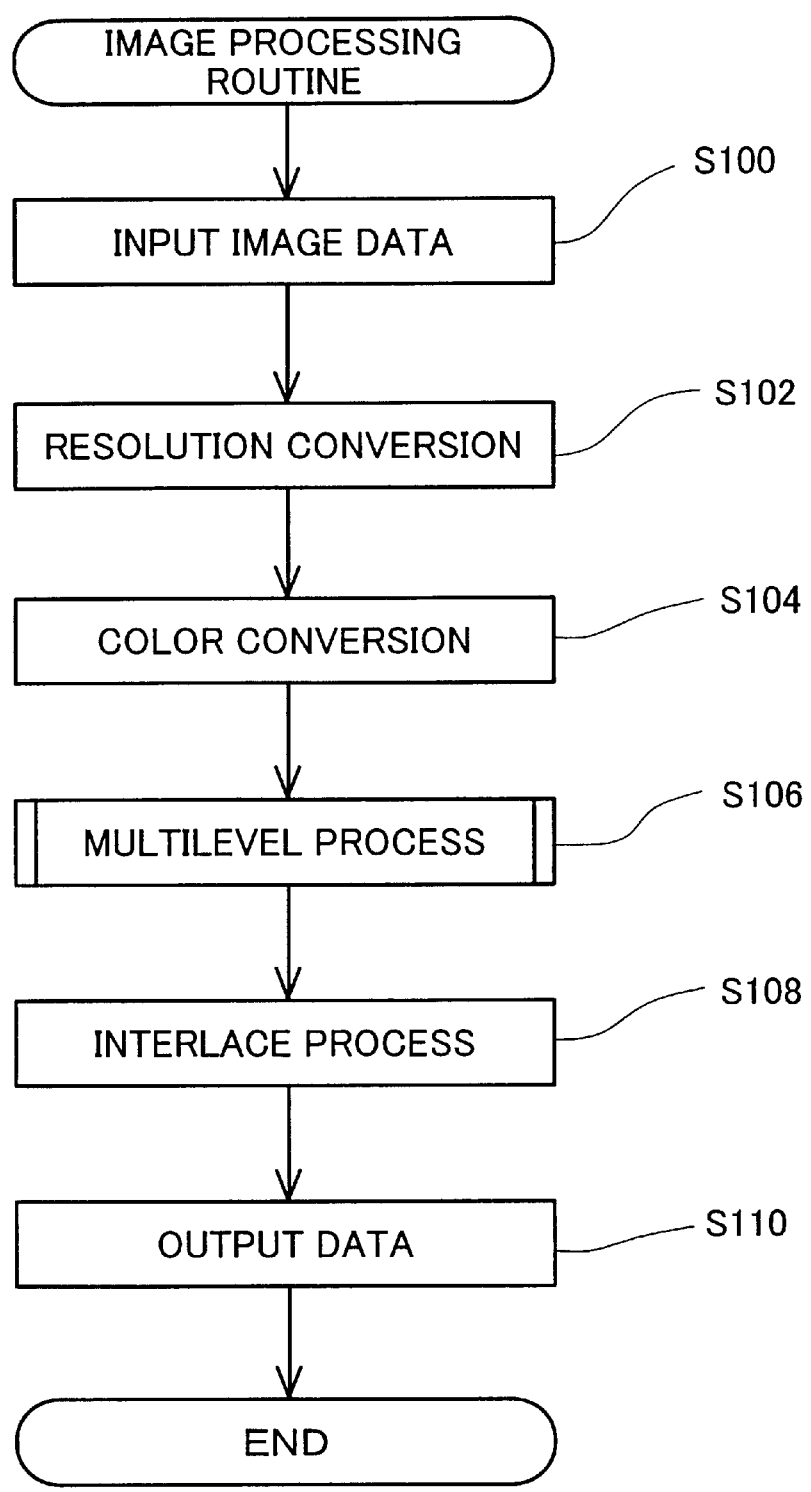
FIG. 10 is a flowchart showing an image processing routine executed in the embodiment.

As discussed above, the color printer 20 has the function of receiving the image data FNL and printing a color image corresponding to the input image data FNL. The computer 80 causes a color original image to be subjected to predetermined image processing and generates the image data FNL. FIG. 10 is a flowchart showing the outline of an image processing routine executed by the CPU 81 in the printer driver 92 of the computer 80. The outline of the image processing is described below with the flowchart of FIG. 10.

When the program enters the image processing routine of FIG. 10, the CPU 81 first input image data at step S100. The image data, which are fed from the application program 91 as described in FIG. 2, are 256-tone data that may take a value in the range of 0 to 255 for each of the colors R, G, and B corresponding to each pixel included in the image. The resolution of the image data depends upon the resolution of the original image data ORG and the like.

The CPU 81 converts the resolution of the input image data into a printing resolution of the color printer 20 at step S102. In the case where the resolution of the input image data is lower than the printing resolution, linear interpolation is carried out to generate a new piece of data between the adjoining pieces of the original image data ORG and thereby implement the conversion of the resolution. In the case where the resolution of the input image data is higher than the printing resolution, on the contrary, the conversion of the resolution is implemented by skipping some pieces of the original image data ORG in a predetermined proportion.

The CPU 81 subsequently carries out color conversion at step S104. The color conversion converts the image data defined by the tone values of R, G, and B into data used in the color printer 20, for example, data defined by the tone values of C, M, Y, and K. A color conversion table LUT (see FIG. 2) is used for the color conversion. The color conversion table LUT stores combinations of the tone values of C, M, Y, and K that cause the color printer 20 to express the colors defined by the respective combinations of the tone values of R, G, and B. A variety of known techniques may be adopted in the color conversion process with the color conversion table. For example, the interpolation technique may be adopted in the color conversion process.

Figure 11:
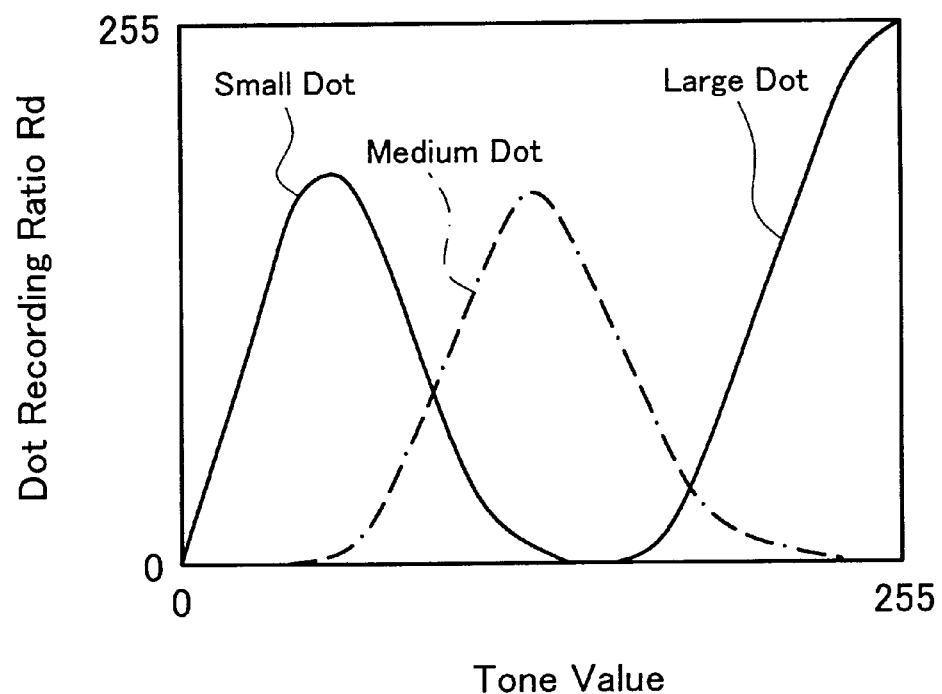
FIG. 11 shows an exemplified table of dot recording ratios used in the embodiment.

After conclusion of the color conversion, the CPU 81 starts a multilevel process at step S106. In this embodiment, the result of the color conversion gives the 256-tone image data consisting of the four colors C, M, Y, and K. In the color printer 20 of this embodiment, on the other hand, there are only four possible levels, that is, 'creation of no dots' 'creation of the small dot', 'creation of the medium dot', and 'creation of the large dot'. It is accordingly required to convert the image of 256 tones into the image of 4 tones expressible by the color printer 20. Such conversion is the multilevel process. The probability of creating the respective dots, the large dot, the medium dot, and the small dot, on the printing medium is varied according to the tone values of the original image, so that the 256 tones of the original image are converted into the 4 tone values expressible by the color printer 20. FIG. 11 is a graph showing variations of the dot recording ratio of the large, medium, and small dots according to the tone value of the original image. The dot recording ratio represents the ratio of a number of dots to be created to a number of pixels included in a specific solid area of a certain tone value in the case of printing the solid area. A table that specifies the dot recording ratio corresponding to each tone value with regard to each variable-size dot as shown in the graph of FIG. 11 (hereinafter referred to as the dot recording ratio table) is stored in the RAM 83 of the computer 80. The multilevel process reads the dot recording ratio table to specify dots to be created at the dot recording ratios corresponding to the respective tone values of the original image. As discussed later, the color printer 20 of this embodiment carries out extraction of the contour of a shape included in the image as part of the multilevel process, in order to improve the picture quality of the resulting printed image.

After the multilevel process, the CPU 81 starts an interlace process at step S108. The interlace process rearranges the image data, which have been converted by the multilevel process into the form that specifies the creation or non-creation of the respective dots, in a sequence to be transferred to the color printer 20. As mentioned previously, the color printer 20 drives the print head 41 and creates lines of dots or raster lines on the printing paper P while repeating the main scans and sub-scans of the carriage 40. As described above with FIG. 4, each of the ink ejection heads 44 through 47 has the plurality of nozzles Nz, so that one main scan forms a plurality of raster lines. These raster lines are located at the intervals of the nozzle pitch k. The smallest possible nozzle pitch k is desired, but it is substantially impossible to reduce the nozzle pitch k down to the interval of the pixels (this corresponds to the nozzle pitch k equal to 1) because of the limit in manufacture of the print head. In order to create raster lines arranged at the intervals of the pixel, the required control procedure first creates a plurality of raster lines located at the intervals of the nozzle pitch k and slightly moves the head position to create new raster lines between the existing raster lines.

The possible control procedure to improve the printing quality forms each raster line by a plurality of main scans. In order to shorten the printing time, the available control procedure creates dots both in the forward motion and the backward motion of the main scans. The sequence of actual dot creation by the color printer 20 is accordingly different from the sequence of pixels on the image data. The interlace process accordingly rearranges the image data.

After the conclusion of the interlace process, the image data are output as the printer-printable image data FNL to the color printer 20 at step S110.

3. Details of Multilevel Process

The color printer 20 of this embodiment carries out an extra process discussed below as part of the multilevel process that has been described briefly, in order to improve the picture quality of the resulting printed image. The extra process extracts the contour of a shape included in the image and allocates the small dot to pixels on the contour. A variety of techniques are applicable to this extra process according to the conditions of printing the image. The simplest procedure changes all the dots to be created in the contour pixels to the small dots. This improves the printing quality to some extent. The more complicated technique utilizes information on a higher resolution than the resolution of the image in printing, in order to further improve the picture quality. This latter technique includes the procedure of externally receiving the information on the higher resolution in the form of image data and the procedure of internally generating the information on the higher resolution in the course of the multilevel process. The following successively describes these three procedures.

(1) First Multilevel Process

Figure 12:
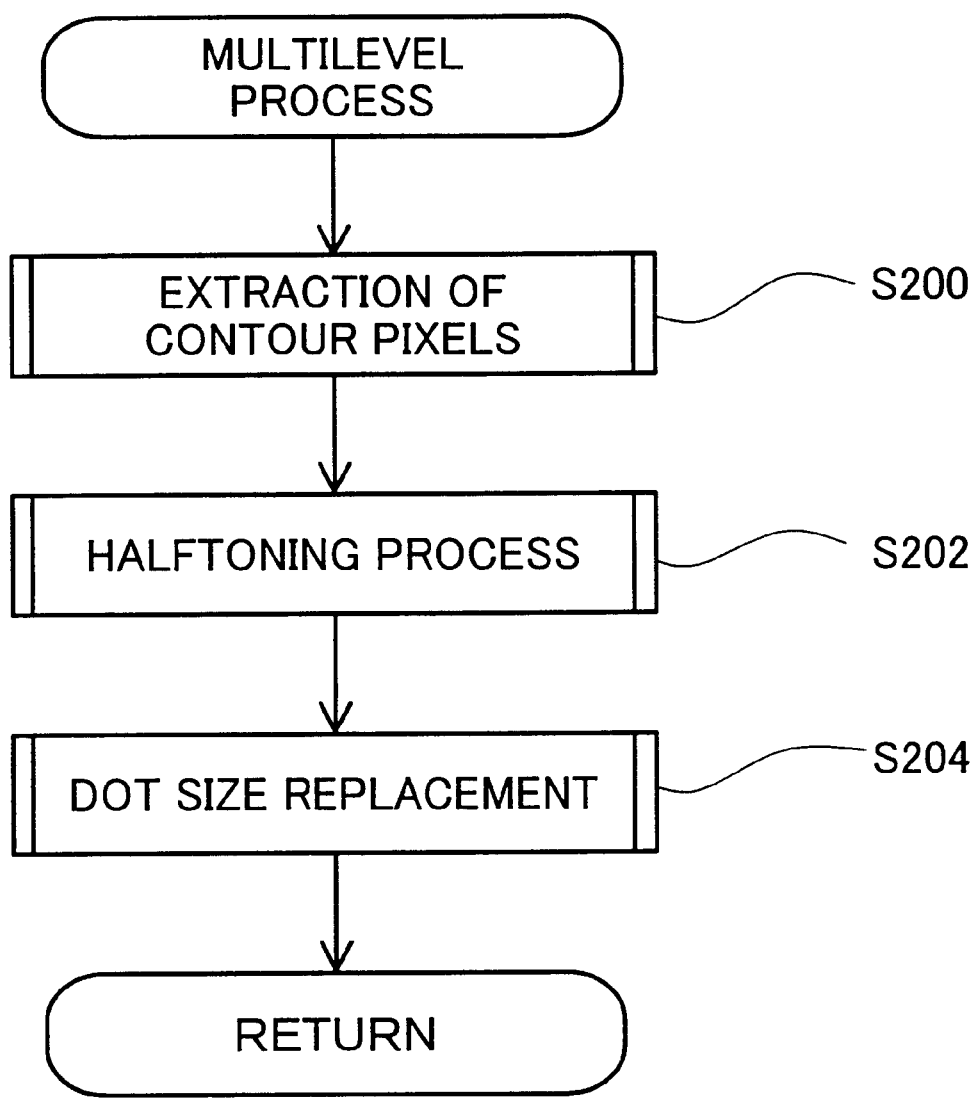
FIG. 12 is a flowchart showing a routine of a first multilevel process of the embodiment.

The first multilevel process corresponds to the simplest procedure mentioned above. FIG. 12 is a flowchart showing a routine of the first multilevel process of the embodiment. The first multilevel process mainly consists of three steps. The program first carries out a contour pixel extraction process at step S200, which extracts a contour included in the image, based on the input tone image data after the color conversion (see FIG. 10). A variety of techniques are applicable to the extraction of the contour as described later.

After the extraction of the contour pixels, the program carries out a halftoning process at step S202. The halftoning process is the nucleus of the multilevel process discussed above with the flowchart of FIG. 10. The halftoning process converts the 256-tone image data, which have been subjected to the color conversion, to the image data that are expressible by the color printer 20 and represent creation or non-creation of dots. The color printer 20 of the embodiment can create three variable-size dots, that is, the large dot, the medium dot, and the small dot. The halftoning process accordingly specifies one of the four levels, that is, 'creation of no dots', 'creation of the small dot', 'creation of the medium dot', and 'creation of the large dot', with regard to all the pixels. A variety of well-known techniques, such as the error diffusion method and the systematic dither method, are applicable to the halftoning process. The halftoning process according to the systematic dither method carried out in this embodiment will be discussed later.

Figure 13:
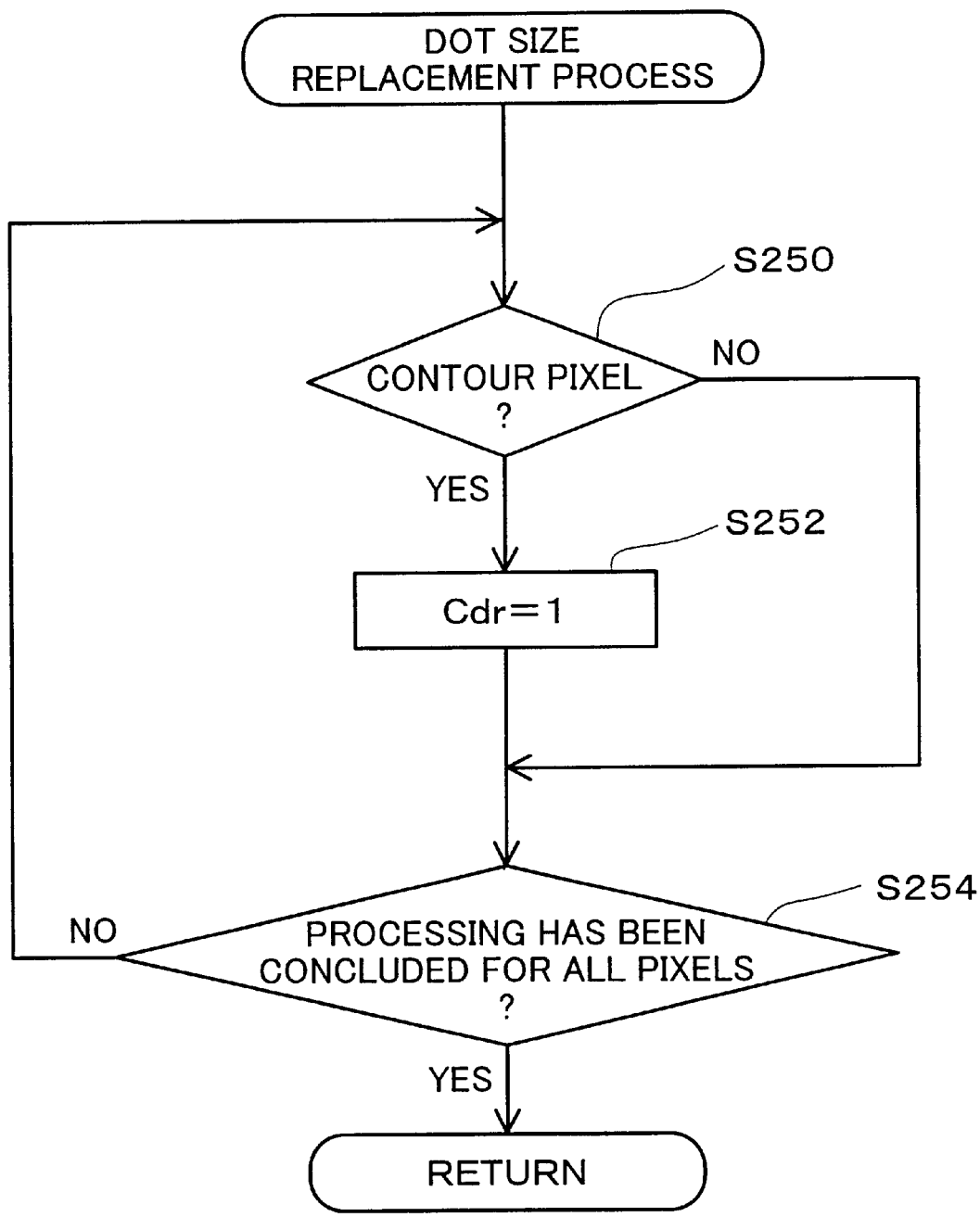
FIG. 13 is a flowchart showing details of the dot size replacement process executed at step S204 in the first multilevel process shown in the flowchart of FIG. 12.

After conclusion of the halftoning process, the program carries out a dot size replacement process at step S204. The dot size replacement process rewrites the results of the halftoning process, in order to cause a predetermined size dot to be created in the pixels extracted by the contour pixel extraction process (step S200). FIG. 13 is a flowchart showing the details of the dot size replacement process. Since the contour pixels have already been extracted by the contour pixel extraction process of step S200 and the results of the extraction have been stored, the program determines whether or not a target pixel, which is a current object to be processed, is a contour pixel at step S250. In the case where the target pixel is a contour pixel, a value Cdr representing the result of the multilevel process is replaced by a value '1' representing the 'creation of the small dot' at step S252. In the case where the target pixel is not a contour pixel, such replacement is not carried out. The above processing is repeatedly executed for all the pixels at step S254. After the conclusion of the dot size replacement process, the program exits from the first multilevel process shown in the flowchart of FIG. 12 and returns to the image processing routine shown in the flowchart of FIG. 10. In the flowchart of FIG. 13, the small dot, that is, the smallest possible dot created by the color printer 20, is formed in the contour pixel. As long as the dot formed in the contour pixel is sufficiently small, it is not restricted to the minimum dot. The color printer 20 of this embodiment can create three variable size dots, that is, the small dot, the medium dot, and the large dot. The medium dot, instead of the small dot, may thus be created in the contour pixel.

FIG. 14 shows an exemplified state of improving the printing quantity by the first multilevel process in the case of printing the figure of an arrow. FIG. 14A shows the shape of an arrow to be printed. FIG. 14B shows the results of the halftoning process (step S202 in the flowchart of FIG. 12), which specify creation or non-creation of a dot in each pixel. In this general case, it is assumed that a black solid arrow is to be printed. The respective pixels constituting the arrow have the tone value of 255, and a value '3' representing 'creation of the large dot' is set in the corresponding pixels. A value '0' representing 'creation of no dots' is omitted from the illustration, for the clarity of illustration. FIG. 14C shows the state of dots formed on a printing medium by the first multilevel process of the embodiment. FIG. 14D shows the state of dots formed on a printing medium by the prior art multilevel process (that is, the multilevel process without the replacement of dots in the contour pixels).

Figure 14A:
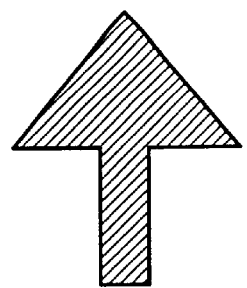
FIG. 14 shows an improvement of the picture quality by the first multilevel process of the embodiment.
Figure 14B:
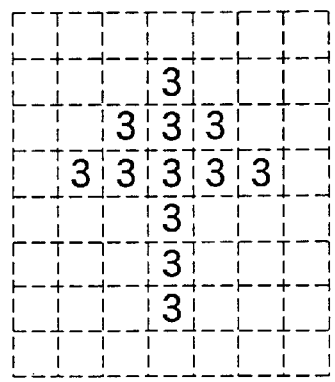
Figure 14C:
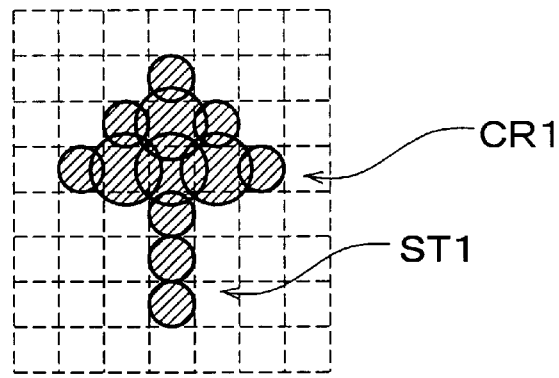
Figure 14D:
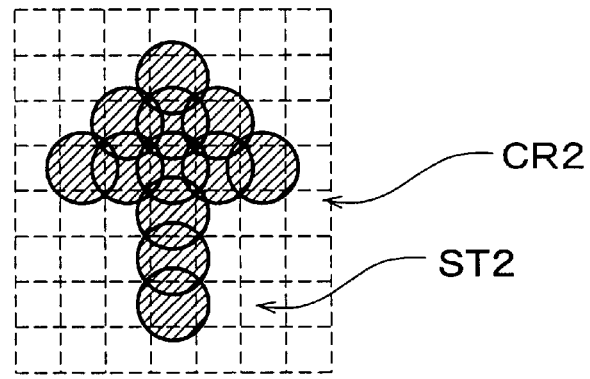

The state of FIG. 14C is compared with the state of FIG. 14D. Whereas the arrow printed by the prior art multilevel process has a round triangular head CR2, the arrow printed by the first multilevel process of the embodiment has a relatively definite triangular head CR1. The arrow printed by the prior art multilevel process also has a thickened shaft ST2, whereas the arrow printed by the first multilevel process of the embodiment has a standard-size shaft ST1.

The first multilevel process of the embodiment improves the picture quality as shown in FIG. 14, because of the following reason. Figures and letters are rarely expressed by the intermediate tone but are basically printed with the large dot. The large dot is designed to have the greater size than the size of the pixel, in order to avoid the possible occurrence of banding in the color printer, that is, the possible occurrence of white streaks on the boundary between adjoining pixels, which results in the poor picture quality, as discussed above. The figures and letters printed with the large dot accordingly have thickened lines and round corners, since the large dot is greater in size than the pixel. The first multilevel process of the embodiment, on the other hand, extracts the pixels on the contour of a figure or a letter, and prints the contour pixels with the smaller dot. This technique effectively prevents the thickened line or the round corner as described above with FIG. 14.

(2) Second Multilevel Process

The second multilevel process is performed when information on a higher resolution than the printing resolution is utilizable, in order to further improve the printing quality of figures and letters. For example, in the following case, the information on a higher resolution than the printing resolution is utilizable. An image consisting of a table, a graph, or a series of letters, is seldom required to have such a rich tone expression as a natural image, but is required to be printed quickly. In the case of printing an image consisting of a figure or a series of letters, the resolution is lowered to attain the quick printing, although the picture quality deteriorates to some extent. By way of example, when image data are expressed by a resolution of 720 dpi both in the main scanning direction and in the sub-scanning direction, the resolution in the main scanning direction may be lowered to 360 dpi. Halving the resolution in the main scanning direction halves the number of pixels included in the image, thereby decreasing the time required for the image processing shown in the flowchart of FIG. 10. This also decreases the number of dots to be created on the printing medium, thereby significantly shortening the total printing time. In this case, there is information on the resolution of 720 dpi both in the main scanning direction and in the sub-scanning direction. The second multilevel process of the embodiment is thus carried out by utilizing the information on the resolution of 720 dpi. This attains the quick printing without deteriorating the picture quality. The second multilevel process of the embodiment is discussed below on the assumption that the image data are expressed by the resolution of 720 dpi both in the main scanning direction and in the sub-scanning direction and the printing resolution only in the main scanning direction is lowered to 360 dpi.

Figure 15:
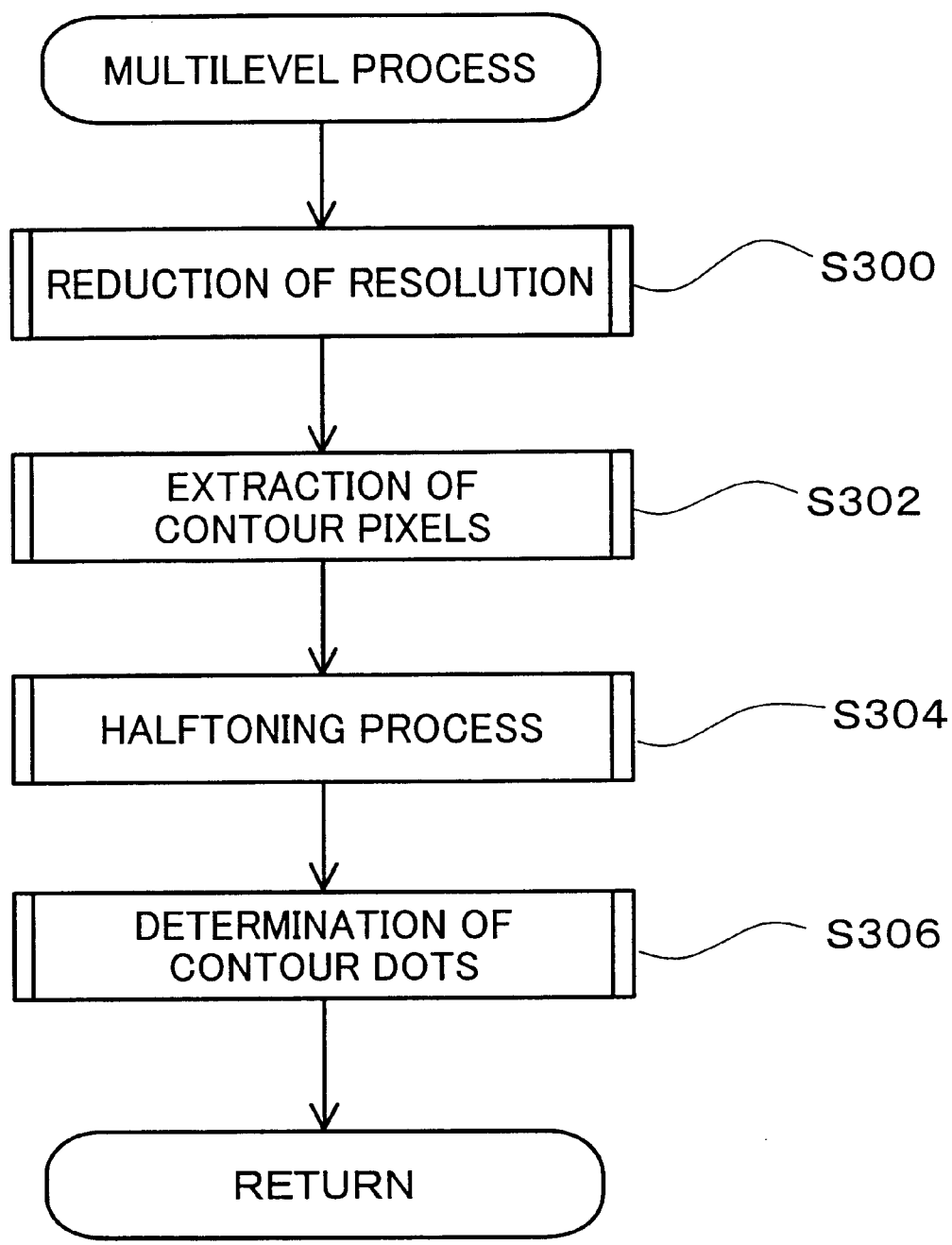
FIG. 15 is a flowchart showing a routine of a second multilevel process of the embodiment.

FIG. 15 is a flowchart showing a routine of the second multilevel process of the embodiment. The second multilevel process mainly consists of four steps. The program first carries out a resolution reduction process at step S300, which lowers the resolution in the main scanning direction from 720 dpi to 360 dpi. This step re-converts the image data, which have once been converted to have the resolution of 720 dpi by the resolution conversion process (step S102 in the flowchart of FIG. 10), to have the resolution of 360 dpi only in the main scanning direction. The resolution conversion process of step S102 does not carry out the immediate conversion of the resolution to 360 dpi, since it is required to refer to the image data with the resolution of 720 dpi, which have been 'subjected to the color conversion (step S104 in the flowchart of FIG. 10), in the second multilevel process of the embodiment. The natural image is printed at the resolution of 720 dpi both in the main scanning direction and in the sub-scanning direction. It is thus convenient for the image processing to convert the image consisting of a figure or a series of letters to have the resolution of 720 dpi.

FIG. 16 shows the resolution reduction process of the embodiment. In this example, the resolution of an image shown in FIG. 16A is reduced. The image is expressed as image data having a resolution of 720 dpi both in the main scanning direction and in the sub-scanning direction and 256 tones as shown in FIG. 16B. For the clarity of illustration, the pixels having high tone values are filled with slant lines and the pixels having low tone values are shown by open squares in the drawings of FIGS. 16B through 16D. The resolution reduction process collects two pixels adjoining to each other in the main scanning direction into one greater-size pixel (hereinafter referred to as large pixel), thereby lowering the resolution in the main scanning direction from 720 dpi to 360 dpi. As an example, the respective sets of two adjoining pixels to be collected into one large pixel are surrounded by the thick dashed line in FIG. 16B. The tone value of the large pixel newly created is calculated from the tone values of the two adjoining pixels according to an equation given below:

(Tone value of Large Pixel)=max(Tone Value of Left Pixel, Tone Value of Right Pixel)

where max (A,B) represents a maximum operator to take the greater value between A and B. The technique of taking the minimum tone value between two pixels or the mean tone value, the line disappears in places having a tone value distribution like A1 and A2. The greater tone value between two pixels is accordingly taken here. The resolution reduction process converts the image data of FIG. 16B to image data of FIG. 16D. As clearly shown in FIG. 16D, the resolution reduction process results in a greater difference in level in places A3 and A4, which deteriorates the picture quality. The second multilevel process of the embodiment is carried out to prevent such deterioration of the picture quality.

Referring back to FIG. 15, after the conclusion of the resolution reduction process at step S300, the program carries out extraction of contour pixels at step S302. The contour pixel extraction process receives tone image data with the lowered resolution and extracts a contour included in the image. A variety of techniques are applicable to the extraction of contour pixels as discussed later.

After the extraction of contour pixels at step S302, the program performs a halftoning process at step S304. The halftoning process included in the second multilevel process is identical with the halftoning process included in the first multilevel process. The halftoning process accordingly converts the image data having the lowered resolution and 256 tones into image data that represent creation or non-creation of dots and are expressible by the color printer 20. The halftoning process determines creation or non-creation of a dot in all the pixels and requires the long processing time in the total time of the image processing shown in the flowchart of FIG. 10. The halftoning process after the resolution reduction process, however, significantly shortens the processing time. The halftoning process specifies one of the four levels, that is, 'creation of no dots', 'creation of the small dot', 'creation of the medium dot', and 'creation of the large dot', with regard to all the pixels.

The image after the halftoning process (step S304) has a poor picture quality as discussed above with FIG. 16D. The second multilevel process of the embodiment allocates predetermined-size dots to the respective contour pixels, in order to prevent the picture quality from deteriorating. The program accordingly carries out a process of determining the contour dots at step S306. The contour dot determination process determines the dot size to be allocated to each large pixel on the contour and rewrites the results of the halftoning process, in order to cause the predetermined-size dots to be created in the large pixels on the contour.

Figure 16A:
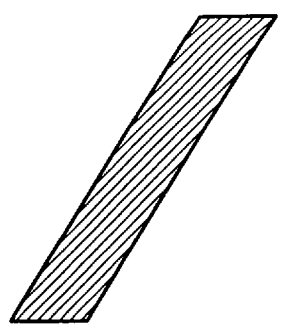
FIG. 16 shows a resolution reduction process executed in the second multilevel process of the embodiment.
Figure 16B:
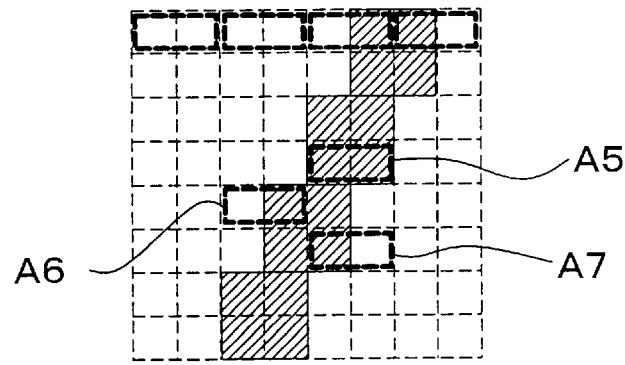
Figure 16C:
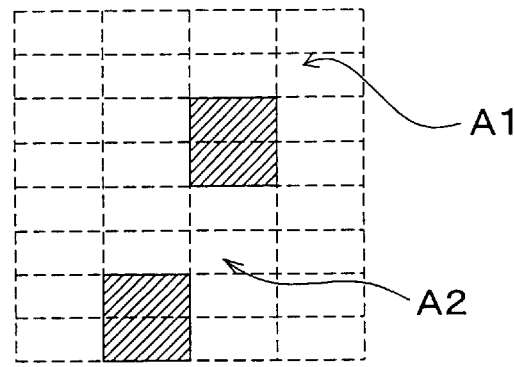
Figure 16D:
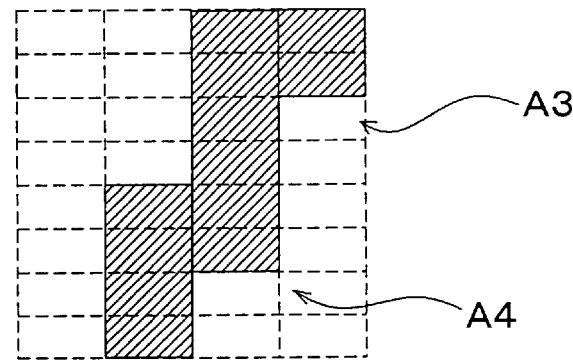
Figure 17:
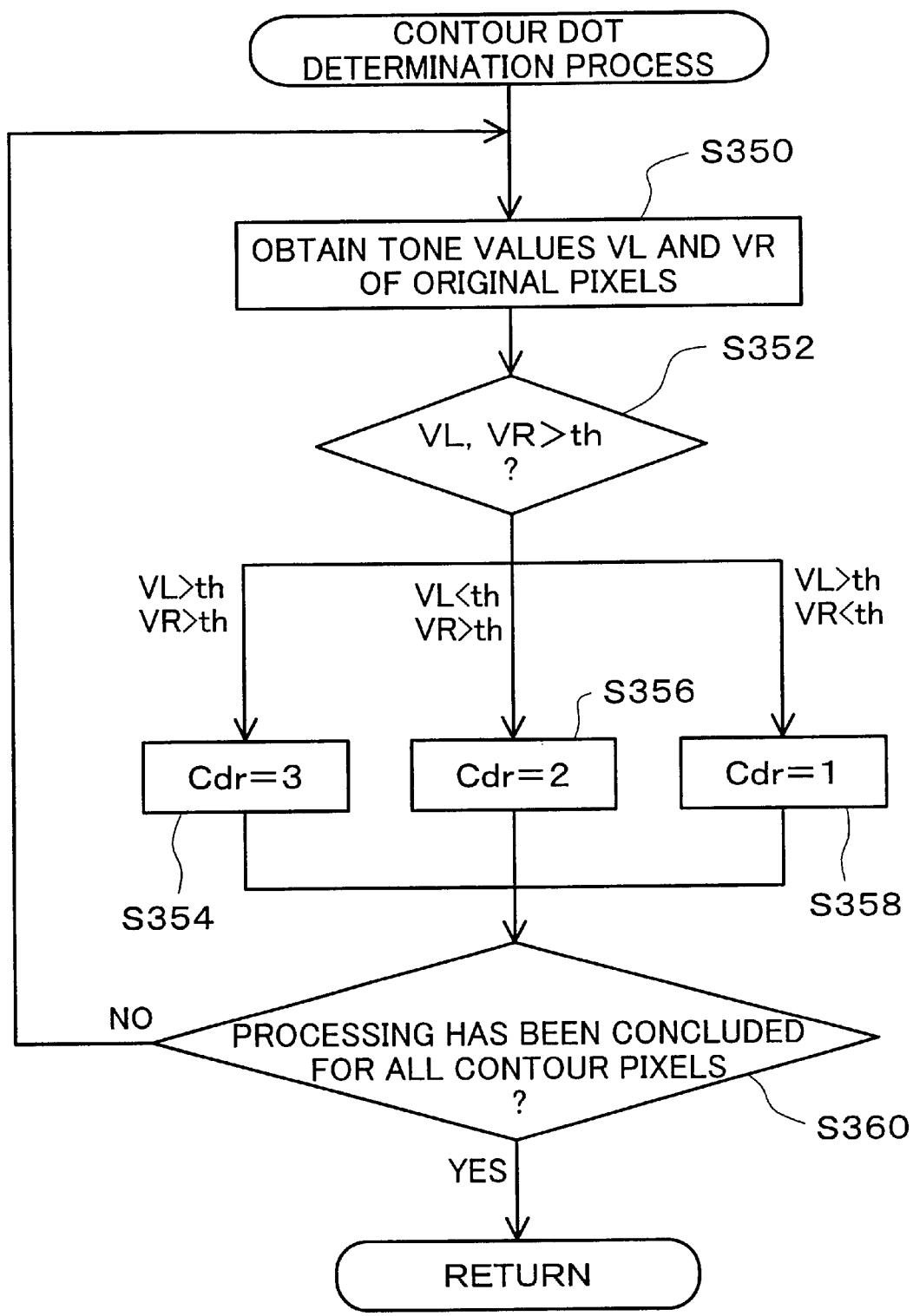
FIG. 17 is a flowchart showing details of the contour dot determination process executed at step S306 in the second multilevel process shown in the flowchart of FIG. 15.

FIG. 17 is a flowchart showing the details of the contour dot determination process. The contour dot determination process first selects one of the contour pixels extracted in advance at step S302 in the flowchart of FIG. 15 and obtains tone values of two original pixels, which have been collected into the selected contour pixel. The resolution reduction process (see FIG. 16) collects two adjoining pixels in the image data originally expressed with the resolution of 720 dpi into each contour pixel. The program accordingly obtains tone values VL and VR of original left pixel and right pixel at step S350.

The tone values VL and VR of the original left and right pixels are respectively compared with a predetermined threshold value th at step S352. The predetermined value th is eventually set based on the observation of the printing quality. A value close to a threshold value used for determination of creation or non-creation of the large dot in the halftoning process may be used as the predetermined threshold value th. The details of the halftoning process will be discussed later. In the case where both the tone values VL and VR of the two original pixels constituting the selected contour pixel are greater than the predetermined threshold value th, the program determines that the large dot is to be created in the selected contour pixel and sets a value '3' representing 'creation of the large dot' to the value Cdr representing the result of the multilevel process at step S354. In the case where the tone value VL of the original left pixel is smaller than the predetermined threshold value th but the tone value VR of the original right pixel is greater than the threshold value th, the program determines that the medium dot is to be created in the selected contour pixel and sets a value '2' representing 'creation of the medium dot' to the value Cdr at step S356. In the case where the tone value VL of the original left pixel is greater than the predetermined threshold value th but the tone value VR of the original right pixel is smaller than the threshold value th, on the contrary, the program determines that the small dot is to be created in the selected contour pixel and sets a value '1' representing 'creation of the small dot' to the value Cdr at step S358.

Figure 18:
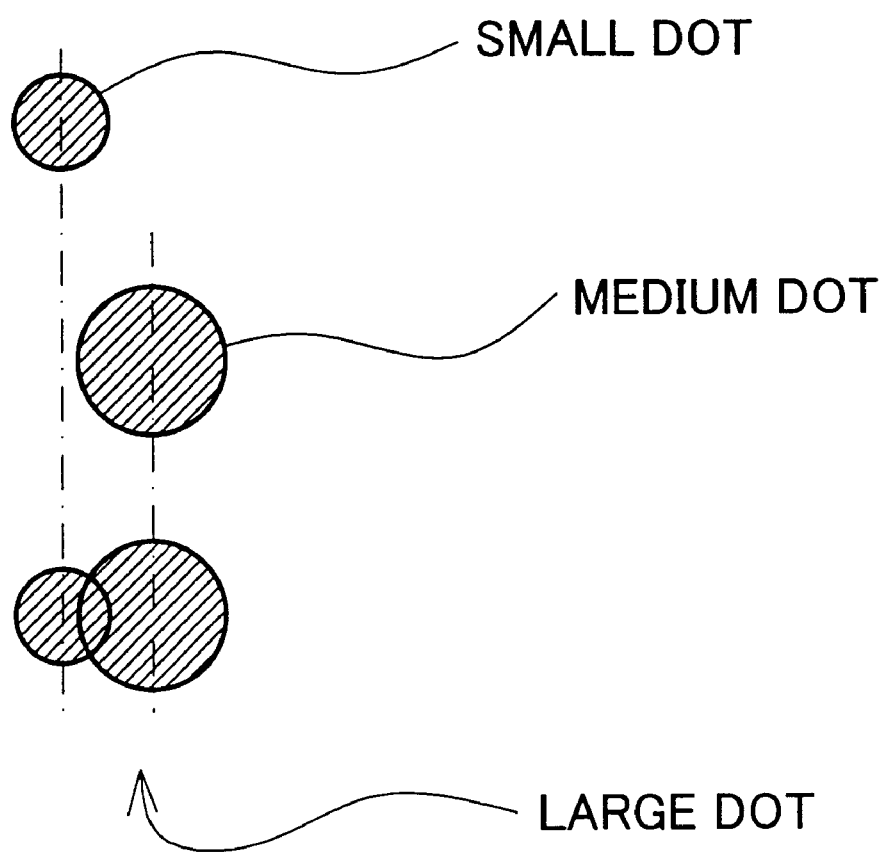
FIG. 18 shows an exemplified positional relationship between the small dot, the medium dot, and the large dot formed on a printing medium.

The size of the dot to be created in the contour pixels is changed according to the tone values of the original left and right pixels, because of the following reason. As described previously with the drawing of FIG. 7, the color printer 20 of the embodiment regulates the ejection timings of the ink droplet Ips for the small dot and the ink droplet Ipm for the medium dot, so as to form both the small dot and the medium dot in an identical pixel and thereby create the large dot. The positions of creating the small dot and the medium dot are not strictly coincident with each other. The ejection timings of the ink droplets Ips and Ipm are regulated to make the positions of creating the respective dots slightly shift from each other in the main scanning direction as shown in FIG. 18. The tone value distribution of the pixels is assigned to the difference between the positions of creating the respective dots. In the example of FIG. 16B, a state of A5 represents the case where both the tone value VL and VR of the original left and right pixels are greater than the predetermined threshold value th. The large dot is accordingly created in the large pixel A5. A state of A6 represents the case where the tone value VL of the original left pixel is smaller than the predetermined threshold value th and the tone value VR of the original right pixel is greater than the threshold value th. The medium dot is accordingly created in the large pixel A6. A state of A7 represents the case where the tone value VL of the original left pixel is greater than the predetermined threshold value th and the tone value VR of the original right pixel is smaller than the threshold value th. The small dot is accordingly created in the large pixel A7. The ejection timings of the two variable-size ink droplets Ips and Ipm may be regulated to have a positional relationship between the small dot and the medium dot reverse to that shown in FIG. 18. The positional relationship between the small dot and the medium dot is not restricted to that of FIG. 18, but may be reversed or otherwise set to create both the small dot and the medium dot at an exactly identical position in the main scanning direction as described later. The above processing is repeatedly executed for all the contour pixels at step S360. After the conclusion of the contour dot determination process, the program exits from the second multilevel process shown in the flowchart of FIG. 15 and returns to the image processing routine shown in the flowchart of FIG. 10.

FIG. 19 shows the second multilevel process carried out in the process of printing the arrow of FIG. 14A to improve the printing quality. FIG. 19A shows the arrow printed without the resolution reduction process. FIG. 19B shows the printing result when the resolution reduction process is carried out to collect two adjoining pixels in the main scanning direction into one large pixel. As clearly shown in FIG. 19B, the resolution reduction process results in deterioration of the picture quality.

Figure 19A:
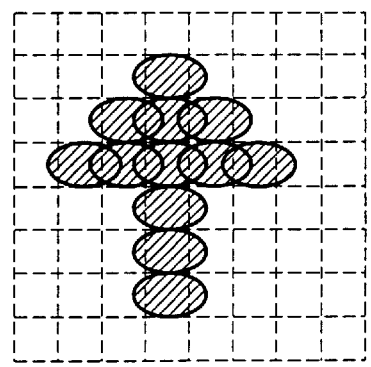
FIG. 19 shows an improvement of the picture quality by the second multilevel process of the embodiment.
Figure 19B:
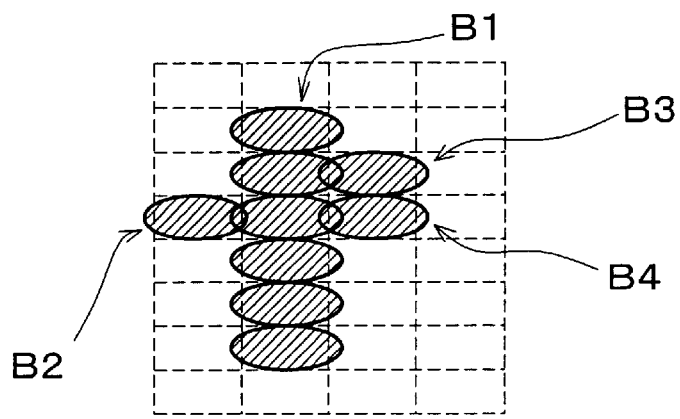
Figure 19C:
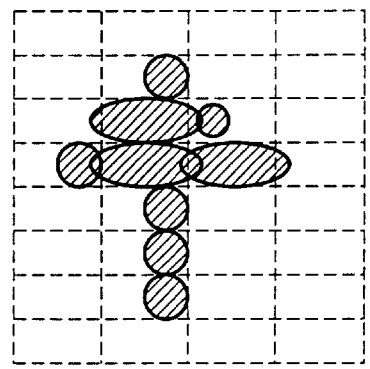

FIG. 19C shows the printing result after the printed image of FIG. 19B is subjected to the second multilevel process of the embodiment. The contour dot determination process (step S306 in the flowchart of FIG. 15) allocates the medium dot to pixels B1 and B2, the small dot to a pixel B3, and the large dot to a pixel B4 in the example of FIG. 19B. The specific dot is allocated to each of the contour pixels in this manner, based on the tone value distribution of the pixels. This technique favorably improves the picture quality to the level at least equivalent to the case of printing with the resolution of 720 dpi. In spite of the significant improvement in picture quality, the technique simply carries out the selective allocation of the variable-size dots, that is, the large dot, the medium dot, and the small dot, to the respective contour pixels included in the image, while setting 360 dpi to the printing resolution of the color printer 20 in the main scanning direction. This technique does not undesirably lengthen the time period required for the image processing and dot formation, thereby not increasing the total time of printing, unlike the technique of printing an image with a high resolution.

Figure 19D:
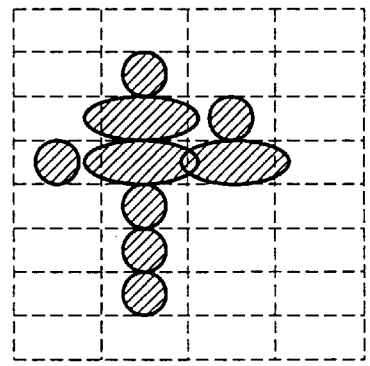

FIG. 19D shows the effect of the second multilevel process in the case where the small dot and the medium dot are formed at an identical position in the main scanning direction. The degree of improvement in picture quality in the case of FIG. 19D is not so high as the degree of improvement in the case of FIG. 19C. The image of FIG. 19D, however, has the significantly improved picture quality, compared with the image of FIG. 19B. In the example of FIG. 19D where the medium dot and the small dot are created at an identical position in the main scanning direction, the medium dot is allocated to the contour pixels unless both the tone values VL and VR of the original left and right pixels constituting the contour pixel are greater than the predetermined threshold value th. The small dot may, however, be allocated to such contour pixels.

The above procedure slightly shifts the position of creating the medium dot from the position of creating the small dot in the main scanning direction, and collects two adjoining pixels in the main scanning direction into one large pixel. Neither the direction of shifting the positions of creating the respective dots nor the direction of collecting the adjoining pixels is, however, restricted to the main scanning direction. One modified procedure forms the small dot and the medium dot with separate nozzles to shift the positions of the respective dots in the sub-scanning direction, and collects two adjoining pixels in the sub-scanning direction into one large pixel. This procedure exerts the similar effects to those discussed above.

(3) Third Multilevel Process

Like the second multilevel process, the third multilevel process utilizes information on a higher resolution than the printing resolution, in order to further improve the printing quality of figures and letters. The information on the higher resolution is previously given in the form of image data in the second multilevel process discussed above, but is generated in the course of the multilevel process by carrying out an interpolation in the third multilevel process discussed below. There are a variety of known techniques applicable to the process of interpolating image data and generating the information on the higher resolution. Even if the image data on the higher resolution are not externally given, this procedure generates the information on the higher resolution to attain the printing of high picture quality. The details of the interpolation process will be discussed later. In the example discussed below, the interpolation is carried out in the main scanning direction. The procedure is, however, applicable to the case where the interpolation is carried out in the sub-scanning direction or to the case where the interpolation is carried out successively in the main scanning direction and in the sub-scanning direction.

Figure 20:
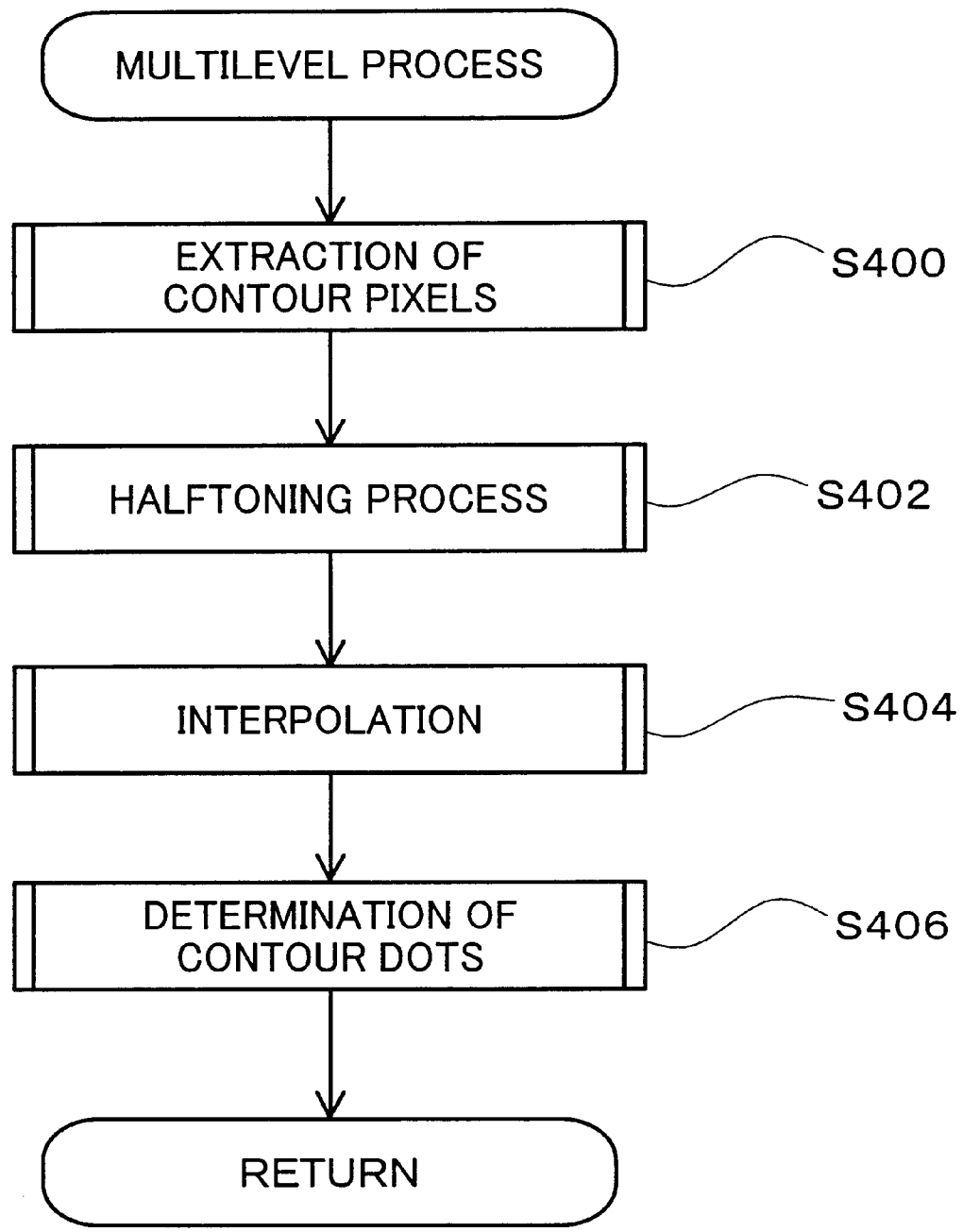
FIG. 20 is a flowchart showing a routine of a third multilevel process of the embodiment.
Figure 21A:
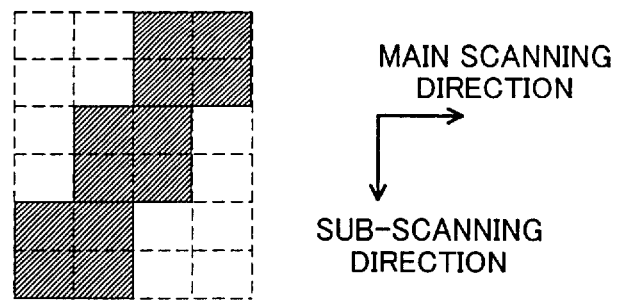
FIG. 21 shows an interpolation process executed in the third multilevel process of the embodiment.
Figure 21B:
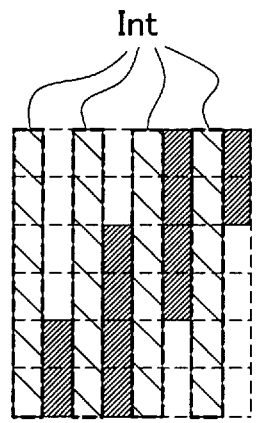
Figure 21C:
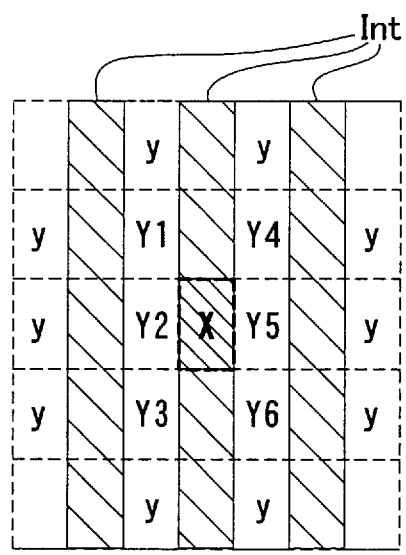
Figure 21D:
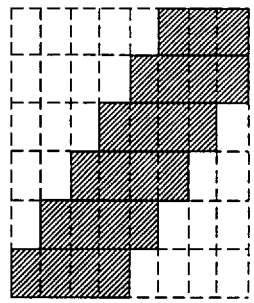
Figure 22A:
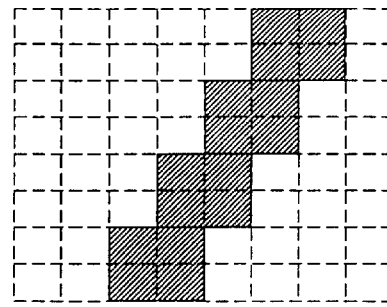
FIG. 22 shows an improvement of the picture quality by the third multilevel process of the embodiment.
Figure 22B:
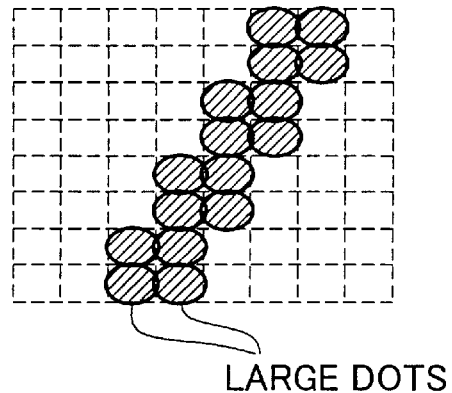
Figure 22C:
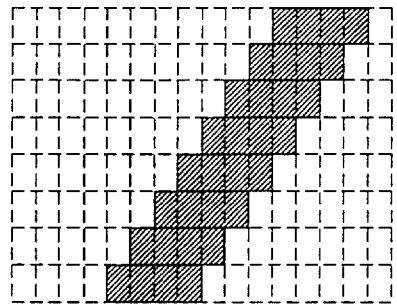
Figure 22D:
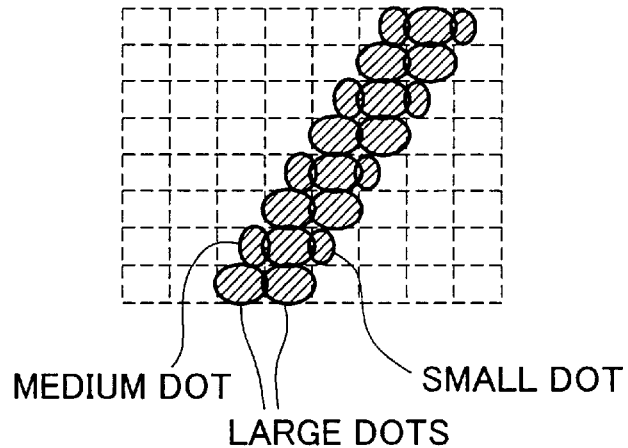

FIG. 20 is a flowchart showing a routine of the third multilevel process of the embodiment. The third multilevel process mainly consists of four steps. The program carries out extraction of contour pixels at step S400, which is identical with the contour pixel extraction process carried out in the first multilevel process or in the second multilevel process and extracts a contour included in the image. A variety of techniques are applicable to the extraction of the contour as discussed later.

After the conclusion of the contour pixel extraction process at step S400, the program carries out a halftoning process at step S402, which is identical with the halftoning process carried out in the first multilevel process or in the second multilevel process. The halftoning process specifies one of the four levels, that is, 'creation of no dots', 'creation of the small dot', 'creation of the medium dot', and 'creation of the large dot', with regard to all the pixels included in the 256-tone image data.

After the conclusion of the halftoning process at step S402, the program carries out an interpolation process at step S404. The halftoning process converts the image data to the four-level expression representing creation or non-creation of the respective dots. The interpolation process increases the number of pixels in the main scanning direction and determines creation or non-creation of the respective dots in the increased pixels. The interpolation of image data may be carried out for the 256-tone image data, but the third multilevel process of the embodiment carries out the interpolation for the image data converted to the less number of tones (that is, four levels) by the halftoning process. This facilitates the processing of interpolation and shortens the time required for the processing, compared with the interpolation of the 256-tone image data.

FIG. 21 shows the interpolation process carried out in the third multilevel process of the embodiment. An image shown in FIG. 21A is interpolated. In the case of interpolation of an image in the main scanning direction, the procedure divides an original image into plural columns of pixels extending in the sub-scanning direction and inserts new columns of pixels between the respective existing columns of pixels. FIG. 21B shows a state where new columns of pixels are inserted between the respective existing columns of pixels. Areas Int roughly filled with slant lines are the inserted columns of pixels. The tone value is determined with regard to each of the pixels of the inserted columns Int. FIG. 21C shows a method of determining the tone value of each pixel. The tone value of a certain pixel X in the inserted column Int of pixels is calculated from the tone values of peripheral pixels in the vicinity of the pixel X, that is, pixels Y1 through Y6, according to the following equation.

$$\text{(Tone value of Pixel } X\text{)} = f(\text{Tone values of Pixels } Y1 \text{ to } Y6)$$

The respective pixels Y1 through Y6 may take one of the four tone values or levels, that is, 'creation of no dots', 'creation of the small dot', 'creation of the medium dot', and 'creation of the large dot'. The function f may be determined experimentally. In this embodiment, the possible tone values of the pixel X are determined in advance and stored in the ROM with regard to all the combinations of the four levels or tone values that the six peripheral pixels may take. The procedure first obtains the tone values of the peripheral six pixels and refers to the ROM, in order to determine the tone value of the certain pixel. Interpolation of the respective pixels in FIG. 21B eventually gives an image shown in FIG. 21D.

The number of the peripheral pixels referred to in the course of determining the tone value of the pixel is not restricted to six. One modified procedure refers to the tone values of ten pixels with the symbol 'y' shown in FIG. 21C in addition to the six peripheral pixels, in order to give a more natural interpolated image.

Referring back to the flowchart of FIG. 20, the third multilevel process of the embodiment carries out a contour dot determination process at step S406 after conclusion of the interpolation. The contour dot determination process reconsiders the dot to be created in each of the contour pixels extracted at step S400 based on the image data on the higher resolution obtained by the interpolation process, in order to improve the printing quality. The details of the processing are similar to those of the contour dot determination process included in the second multilevel process and shown in the flowchart of FIG. 17. The outline of the processing executed in the third multilevel process is described by referring to the flowchart of FIG. 17. The program first obtains the tone values of original pixels constituting each contour pixel (corresponding to step S350). The original pixels here imply two pixels generated at the position of the contour pixel by the interpolation (step S404 in the flowchart of FIG. 20). The tone values of the two original pixels are compared with a predetermined threshold value th (corresponding to step S352). In the event that both the tone values are greater than the threshold value th, the program determines that a large dot is to be created and a value '3' is set to the value Cdr representing the result of the multilevel process (corresponding to step S354). In the event that the threshold value th is greater than the tone value of the original left pixel but smaller than the tone value of the original right pixel, the program determines that a medium dot is to be created and a value '2' is set to the value Cdr (corresponding to step S356). In the event that the threshold value th is smaller than the tone value of the original left pixel but greater than the tone value of the original right pixel, the program determines that a small dot is to be created and a value '1' is set to the value Cdr (corresponding to step S358). When the processing has been completed for all the contour pixels (corresponding to step S360), the program concludes the contour dot determination process, exits from the third multilevel process shown in the flowchart of FIG. 20, and returns to the image processing routine shown in the flowchart of FIG. 10.

FIG. 22 shows an improvement of the printing quality by the third multilevel process of the embodiment. FIG. 22A shows original image data. The conventional multilevel process results in printing an image shown in FIG. 22B. FIG. 22C shows a result of the interpolation discussed previously with FIG. 21. FIG. 22D shows a printed image obtained by the third multilevel process of the embodiment. As clearly shown in FIG. 22D, the resulting image consists of the large, medium, and small dots specified according to the information on the higher resolution obtained by the interpolation, and has a smoother contour.

In the above procedure, the position of creating the medium dot is slightly shifted from the position of creating the small dot in the main scanning direction. As discussed previously in the second multilevel process, however, the creation of the medium dot and the small dot at an identical position in the main scanning direction has similar effects on the improvement of the picture quality.

4. Extraction of Contour Pixels

Figure 23A:
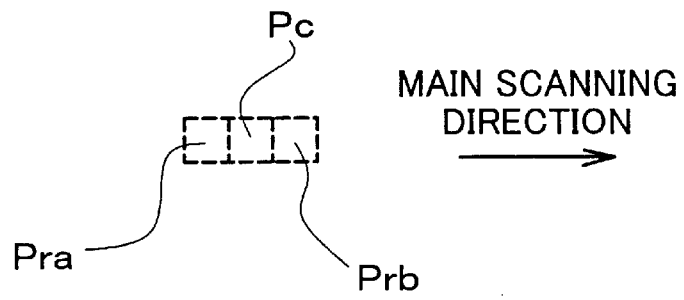
FIG. 23 shows a contour pixel extraction process executed in the third multilevel process of the embodiment.

The procedure of the embodiment discussed above extracts the contour, based on the tone values of adjoining pixels. FIG. 23 shows the details of the contour pixel extraction process executed in this embodiment. As shown in FIG. 23A, one set, which is the unit for the determination, includes a target pixel Pc, for which the determination of the contour pixel is carried out, and a forward reference pixel Prb and a rearward reference pixel Pra before and after the target pixel Pc. The process determines whether or not the target pixel Pc is a contour pixel, based on the tone values of these pixels Pc, Prb, and Pra, while collectively moving the set of these three pixels in the main scanning direction. This procedure is described concretely with reference to FIGS. 23B through 23D.

Figure 23B:
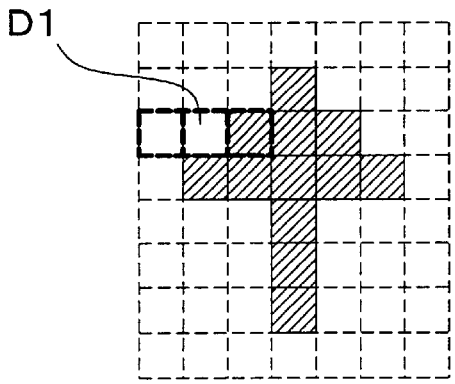
Figure 23C:
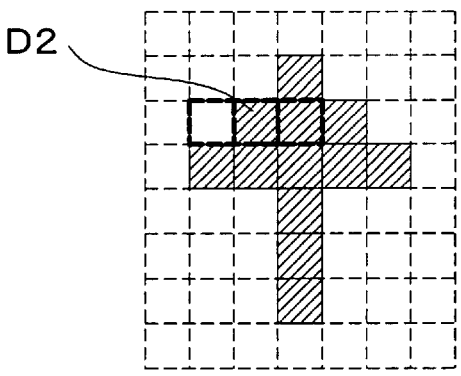
Figure 23D:
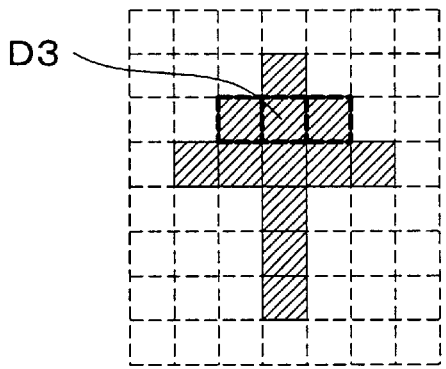

FIGS. 23B through 23D show the 256-tone image data representing the image of the arrow shown in FIG. 14A, prior to the multilevel process (see FIG. 10). For the clarity of illustration, the pixels with a high tone value are filled with slant lines, whereas the pixels with a low tone value are shown by open squares. By way of example, it is assumed that the target pixel Pc is located in a pixel D1 shown in FIG. 23B. In this case, the forward reference pixel Prb has a high tone value, but the target pixel Pc has a low tone value. It is accordingly determined that the pixel D1 is not located on the contour. The target pixel Pc is then shifted by one pixel in the main scanning direction to be located in a pixel D2 (state of FIG. 23C). In this case, both the forward reference pixel Prb and the target pixel Pc have the high tone value, and it is accordingly determined that the pixel D2 is located on the contour. The target pixel Pc is further shifted by one pixel to be located in a pixel D3 (state of FIG. 23D). In this case, all the target pixel Pc and the forward and rearward reference pixels Prb and Pra have the high tone value, and it is accordingly determined that the pixel D3 is located not on the contour but inside the figure.

Figures 24A, 24B:
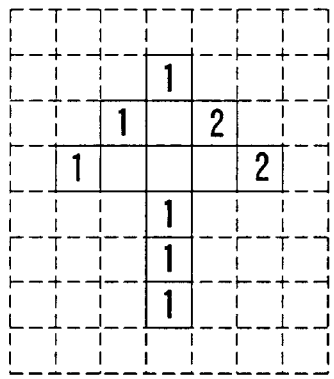
FIG. 24 shows tone values of the respective pixels referred to in the course of the extraction of contour pixels and results of determination with regard to the contour pixel.

FIG. 24A shows all the possible combinations of the tone values of the target pixel, the forward reference pixel, and the rearward reference pixel, as well as the results of the determination of whether or not the target pixel is a contour pixel. The symbol H shows that the pixel has a high tone value, and the symbol L shows that the pixel has a low tone value. The level of the tone value of each pixel is determined, based on the comparison with a predetermined threshold value as discussed later. A value '0' given as a result of the determination shows that the target pixel is not a contour pixel. Both values '1' and '2' given as results of the determination show that the target pixel is a contour pixel. In the case of the contour pixel, the result of the determination may take one of the two values '1' and '2'. These values '1' and '2' are used to discriminate the state of starting a figure from the position of the target pixel, that is, the state in which the target pixel and the forward reference pixel are included in the figure but the rearward reference pixel is not included in the figure, from the state of ending a figure at the position of the target pixel, that is, the state in which the target pixel and the rearward reference pixel are included in the figure but the forward reference pixel is not included in the figure. The symbol '-' in FIG. 24A shows that no corresponding tone value is present, for example, in the case where the target pixel is at an end of the image. The contour pixels of the image shown in FIG. 23B are extracted according to the table of FIG. 24A. This gives the results shown in FIG. 24B. For the clarity of illustration, the results of the determination are shown only for the contour pixels in FIG. 24B.

Figure 25:
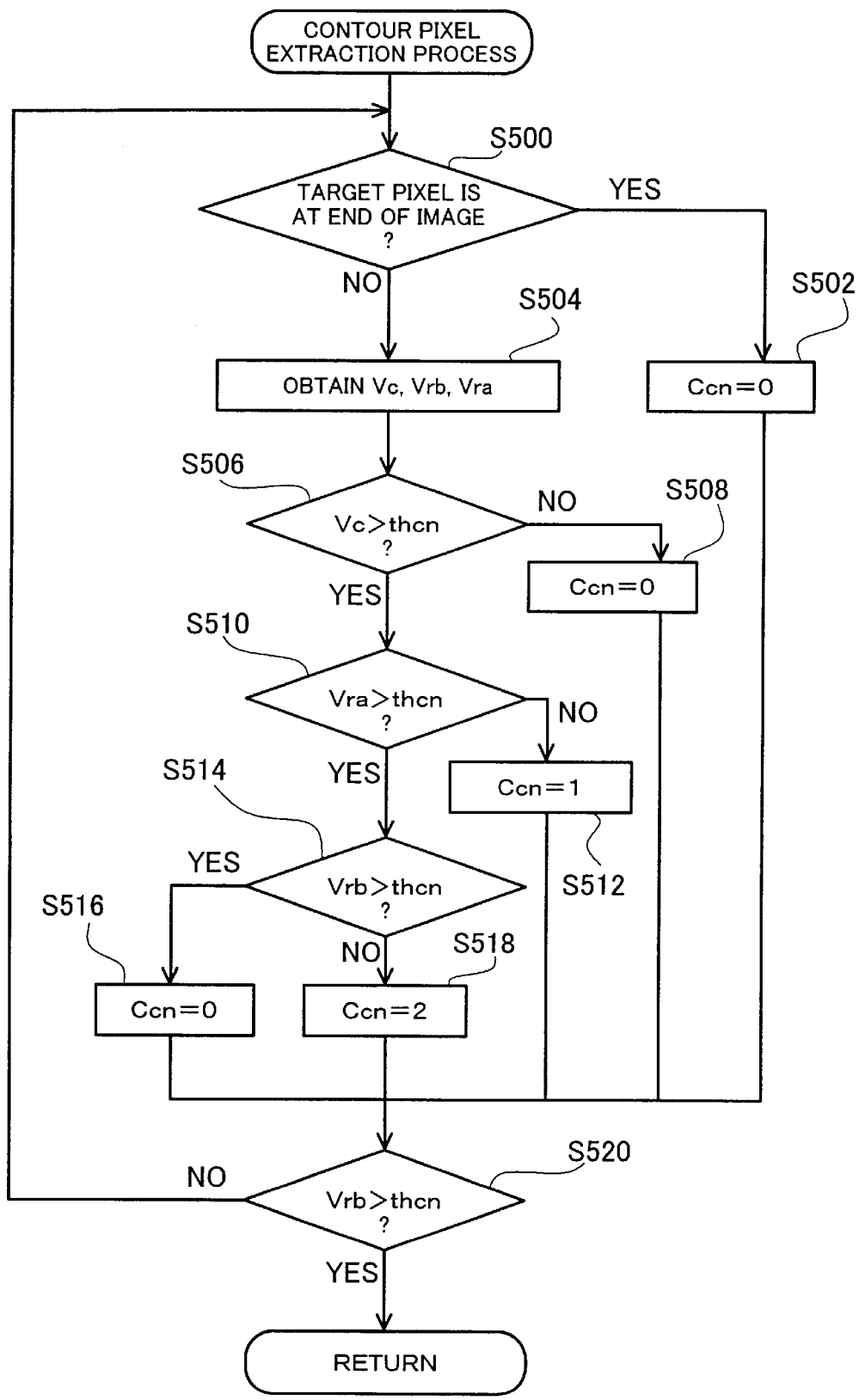
FIG. 25 is a flowchart showing details of the contour pixel extraction process executed in the first through the third multilevel processes of the embodiment.

FIG. 25 is a flowchart showing a routine of the contour pixel extraction process executed in the first through the third multilevel processes. When the program enters the contour pixel extraction process, the program first determines whether or not a target pixel is located at an end of an image at step S500. In the case where the target pixel is located at the end of the image, the program does not carry out the extraction of contour pixels and sets the value '0' to a value Ccn representing the result of the determination at step S502. In the case where the target pixel is not located at the end of the image, on the other hand, the program obtains tone values Vc, Vrb, and Vra of the target pixel Pc, the forward reference pixel Prb, and the rearward reference pixel Pra at step S504, in order to carry out the extraction of contour pixels. The program compares the tone value Vc of the target pixel Pc with a predetermined threshold value then at step S506. In the event that the tone value Vc is smaller than the threshold value then, the program determines that the target pixel Pc is not a contour pixel and sets the value '0' to the result of the determination Ccn at step S508. The predetermined value then is eventually set based on the observation of the printing quality. A value close to a threshold value used for determination of creation or non-creation of the large dot in the halftoning process may be used as the predetermined threshold value then. The details of the halftoning process will be discussed later.

In the event that the tone value Vc is greater than the threshold value then, it is determined that the target pixel Pc is on the contour of the figure or inside the figure. According to the table of FIG. 24A, if at least the tone value of the rearward reference pixel Pra is L, the result of the determination with regard to the target pixel Pc is equal to 1. The tone value Vra of the rearward reference pixel Pra is then compared with the predetermined threshold value then at step S510. When the tone value Vra is smaller than the threshold value then, the value '1' is set to the result of the determination Ccn at step S512. When the tone value Vra is greater than the threshold value the, on the other hand, the tone value Vrb of the forward reference pixel Prb is further compared with the predetermined threshold value then at step S514. When the tone value Vrb is greater than the threshold value then, the value '0' is set to the result of the determination Ccn at step S516. In this case, all the tone values Vc, Vrb, and Vra of the target pixel Pc, the forward reference pixel Prb, and the rearward reference pixel Pra are greater than the predetermined threshold value then. It is accordingly determined that the target pixel Pc is located inside the figure. When the tone value Vrb of the forward reference pixel Prb is smaller than the threshold value the, the value '2' is set to the result of the determination Ccn at step S518. In this case, it is determined that the target pixel Pc and the rearward reference pixel Pra are included in the figure but the forward reference pixel Prb is not included in the figure. When the processing has been completed for all the pixels at step S520, the program concludes the contour pixel extraction process shown in the flowchart of FIG. 25 and returns to one of the first through the third multilevel processes shown in FIGS. 12, 15, and 20.

Figure 26A:
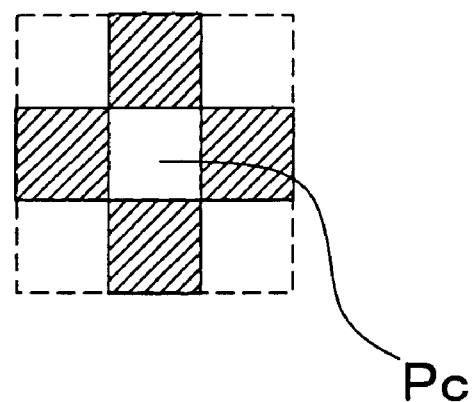
FIG. 26 shows a procedure of extracting contour pixels by referring to four proximity pixels.
Figure 26B:
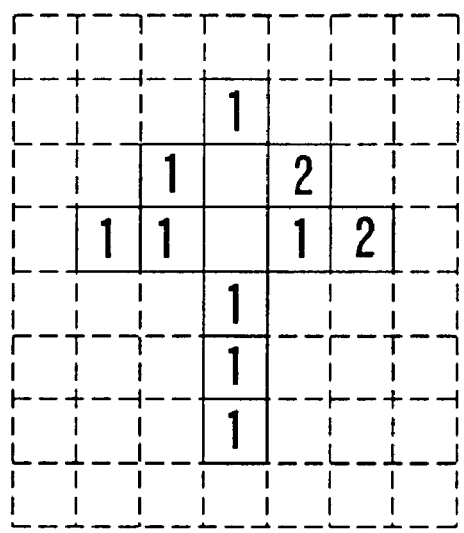

The contour pixel extraction process discussed above refers to the tone values of the left and right pixels adjoining to the target pixel. One possible modification refers to four proximity pixels adjoining to the target pixel. FIG. 26 conceptually shows the outline of the modified contour pixel extraction process. The four proximity pixels represent four pixels respectively adjoining to a certain pixel across its sides. FIG. 26A shows four proximity pixels adjoining to the target pixel Pc.

The principle of the technique discussed above is also applicable to the process of referring to the four proximity pixels and extracting the contour pixels. When the target pixel is located at the end of the image, when the target pixel has a low tone value, or when all the four proximity pixels have a high tone value, it is determined that the target pixel is not a contour pixel. When the target pixel has the high tone value and one through three of the four proximity pixels have the high tone value, on the other hand, it is determined that the target pixel is a contour pixel. The pixels above and below the target pixels may be treated like the forward reference pixel and the rearward reference pixel, in order to discriminate the state in which a figure starts at the target pixel from the state in which a figure ends at the target pixel.

The procedure refers to the four proximity pixels in the image shown in FIG. 23B and extract the contour pixels. This gives a result shown in FIG. 26B. Compared with the result of the extraction shown in FIG. 24B, this modified technique using the four proximity pixels more accurately extracts the contour on the bottom of the triangular head of the arrow, thereby further improving the printing quality. The four proximity pixels may be replaced with eight proximity pixels, which are also known in the art. The eight proximity pixels generally represent eight pixels that are in contact with a certain pixel across its sides or corners.

5. Halftoning Process by Systematic Dither Method

The halftoning process executed in this embodiment is discussed briefly. The threshold value then used in the contour pixel extraction process discussed above is determined by referring to the threshold value used for the determination of creation or non-creation of the large dot in the halftoning process. There are a variety of known techniques applicable for the halftoning process. Any of these techniques other than that discussed below are applicable to the processing of the embodiment.

Figure 27:
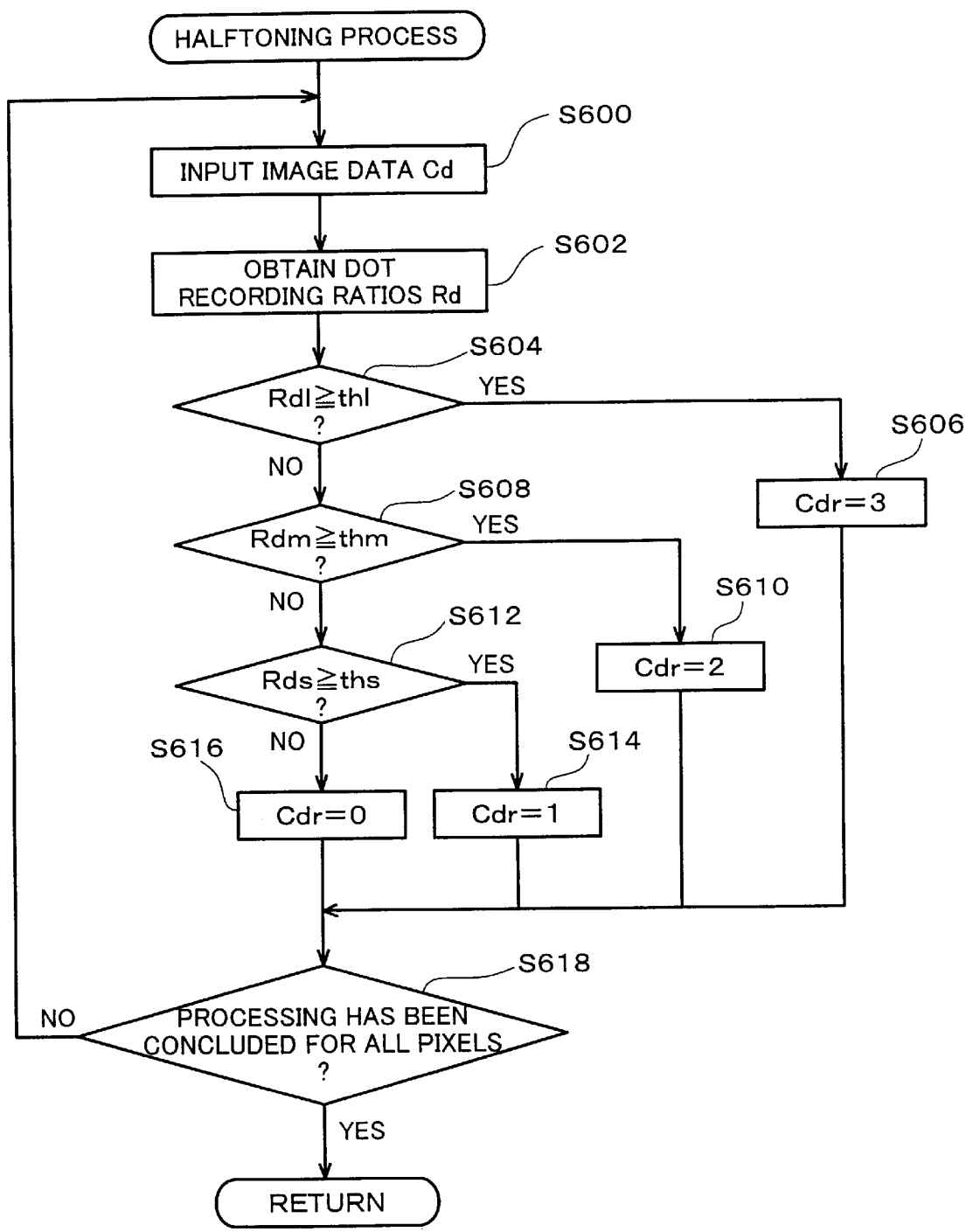
FIG. 27 is a flowchart showing details of the halftoning process executed at step S106 in the image processing routine shown in the flowchart of FIG. 10.

FIG. 27 is a flowchart showing a routine of the halftoning process executed by the printer driver 92 according to the systematic dither method. In this embodiment, the halftoning process is carried out in parallel for the respective colors C, M, Y, and K. For the clarity of explanation, however, the color is not specified in the following description.

When the program enters the halftoning process of FIG. 27, the CPU 81 first reads image data Cd at step S600. The image data Cd Few 10 here represents a 256-tone image of each color after the color conversion. The CPU 81 then refers to the table of dot recording ratios shown in FIG. 11 and simultaneously obtains dot recording ratios Rdl, Rdm, and Rds of the large dot, the medium dot, and the small dot corresponding to the input image data Cd at step S602. The dot recording ratio Rd is equal to 255 in the state that dots are formed in all the pixels. This is for convenience of the data processing and is ascribed to the 8-bit expression of data by the computer 80.

The dot recording ratio Rdl of the large dot is compared with a first threshold value thl at step S604. When the dot recording ratio Rdl of the large dot is greater than the first threshold value thl, the value '3' representing 'creation of the large dot' is set to the result of the multilevel process Cdr at step S606. Different values are allocated as the first threshold value thl to the respective pixels, based on a dither matrix.

Figure 28:
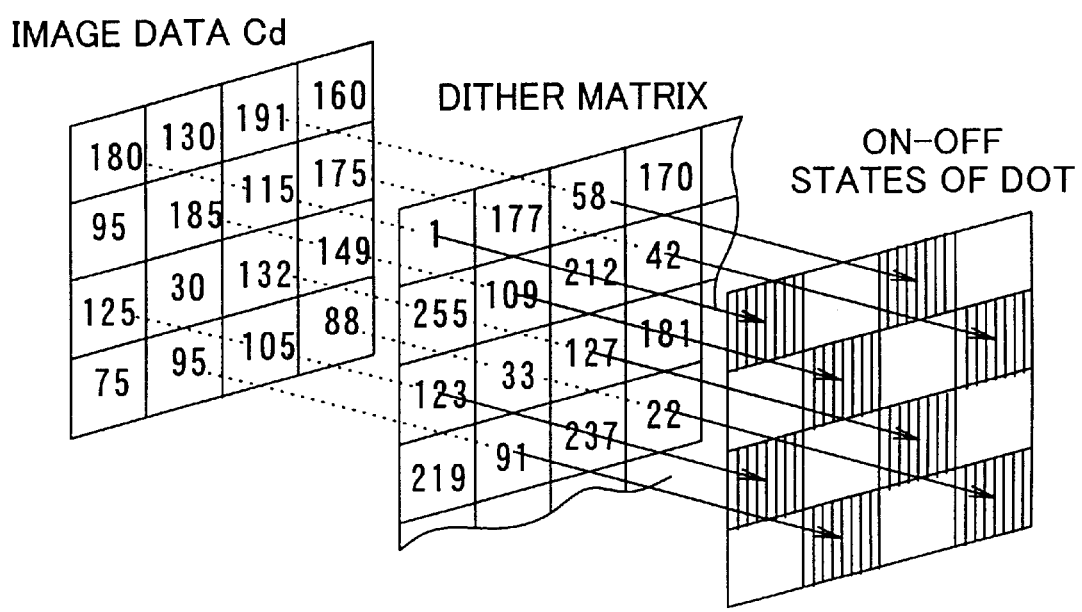
FIG. 28 shows the halftoning process according to the systematic dither method.

The principle of the halftoning process according to the systematic dither method is described with reference to FIG. 28. For the simplicity of explanation, only part of image data (4×4 pixels) is shown in FIG. 28. By way of example, it is assumed that image data Cd including 1000 (length)×1000 (width) pixels are subjected to the multilevel process according to the systematic dither method. The procedure provides a dither matrix of the same size, that is, 1000 (length)×1000 (width), as that of the image data Cd and allocates threshold values of 0 to 255 at random to the respective pixels included in the dither matrix. The procedure compares the tone value of the image data Cd in a certain pixel with the threshold value at a corresponding position in the dither matrix. The procedure determines creation of the dot in the pixels where the tone value of the image data is greater than the threshold value in the dither matrix. The procedure determines no creation of the dot, on the contrary, in the pixels where the tone value of the image data is smaller than the threshold value in the dither matrix. In the example of FIG. 28, the tone value of the image data is compared with the threshold value in the dither matrix at each pixel position. The dot is formed only in the pixels where the tone value of the image data is greater than the threshold value (shown by hatches). The dither matrix, however, has a large number of pixels and requires a large storage capacity in the memory of the computer 80. The actual procedure accordingly provides a smaller matrix, which has the size of 16 (length)×16 (width) pixels and includes the threshold values of 0 to 255 allocated to the respective pixels without any polarization, and successively shifts the position of the smaller matrix to be used as the dither matrix.

The printer driver 92 of this embodiment refers to the table of dot recording ratios (FIG. 11), reads the dot recording ratios Rd of the respective pixels corresponding to the input image data Cd, and carries out the halftoning process based on the dot recording ratios Rd, according to the systematic dither method discussed above.

When the dot recording ratio Rdl of the large dot is smaller than the first threshold value thl, the program subsequently determines creation or non-creation of the medium dot. According to the concrete procedure, the dot recording ratio Rdm of the medium dot is compared with a second threshold value thm at step S608. In the case where the dot recording ratio Rdm of the medium dot is greater than the second threshold value thm, the value '2' representing 'creation of the medium dot' is set to the result of the multilevel process Cdr at step S610. This procedure determines creation or non-creation of the medium dot only for the pixels where the large dot is not formed. This effectively prevents the large dot and the medium dot from being created in an identical pixel. The second threshold value thm used for the determination of creation or non-creation of the medium dot is read from a dither matrix provided for the medium dot. If the dither matrix for the large dot is used in common to determine creation or non-creation of the medium dot, neither the large dot nor the medium dot may be formed in the pixels having a large threshold value close to 255. This undesirably lowers the picture quality. In order to avoid such trouble, the printer driver 92 of this embodiment provides separate dither matrixes for the large dot, the medium dot, and the small dot. If it is highly required to save the storage capacity of the memory in the computer 80, however, a common dither matrix may be provided for all the variable-size dots.

In the case where the dot recording ratio Rdm of the medium dot is smaller than the second threshold value thm, the program determines creation or non-creation of the small dot. The procedure compares the dot recording ratio Rds of the small dot with a third threshold value ths at step S612. When the dot recording ratio Rds of the small dot is greater than the third threshold value ths, the value '1' representing 'creation of the small dot' is set to the result of the multilevel process Cdr at step S614. When the dot recording ratio Rds of the small dot is smaller than the third threshold value ths, on the other hand, the value '0' representing 'creation of no dots' is set to the result of the multilevel process Cdr at step S616. After the determination has been completed for all the pixels, the program exits from the halftoning process shown in the flowchart of FIG. 27.

The present invention is not restricted to the above embodiment or its modifications, but there may be many other modifications, changes, and alterations without departing from the scope or spirit of the main characteristics of the present invention. For example, the software or application programs that actualize the above functions may be supplied through a communication line to the main memory of the computer system or an external storage device.

The scope and spirit of the present invention are limited only by the terms of the appended claims.

What is claimed is:

1. A printer having a print head that enables creation of at least two variable-size dots, that is, a larger-size dot and a smaller-size dot, said printer driving said print head and carrying out both main scan and sub-scan to print an image, said printer comprising:

a contour pixel extraction unit that extracts contour pixels based on image data, the contour pixels representing the contour of a shape included in the image;

a dot creation decision unit that determines creation or non-creation of each of the at least two variable-size dots with regard to each pixel based on the image data, and allocates the smaller-size dot to each of the contour pixels extracted by said contour pixel extraction unit; and a dot creation unit that actually creates the at least two variable-size dots, based on results of the determination and the allocation with regard to the respective pixels by said dot creation decision unit.

2. A printer having a print head that enables creation of at least two variable-size dots, that is, a larger-size dot and a smaller-size dot, said printer driving said print head and carrying out both main scan and sub-scan to print an image, said printer comprising:

a contour pixel extraction unit that extracts contour pixels based on image data, the contour pixels representing the contour of a shape included in the image;

a dot creation decision unit that determines creation or non creation of each of the at least two variable-size dots with regard to each pixel based on the image data, and allocates the smaller-size dot to each of the contour pixels extracted by said contour pixel extraction unit; and a dot creation unit that actually creates the at least two variable-size dots, based on results of the determination and the allocation with regard to the respective pixels by said dot creation decision unit, wherein said contour pixel extraction unit defines a plurality of adjoining pixels in a main scanning direction as one set, compares a tone value of each pixel included in the set with a predetermined threshold value, and extracts the contour pixels based on a result of the comparison.

3. A printer in accordance with claim 1, wherein said dot creation decision unit comprises:

a tentative dot creation storage unit that tentatively determines creation or non-creation of each of the at least two variable-size dots in each pixel based on the image data, and stores a result of the tentative determination; and a definite dot creation decision unit that rewrites the result of the tentative determination to create the smaller-size dot in the contour pixels, and settles the rewritten result as a result of the determination by said dot creation decision unit.

4. A printer having a print head that enables creation of at least two variable-size dots, said printer driving said print head and carrying out both main scan and sub-scan to print an image, said printer comprising:

a resolution reduction unit that collects every preset number of adjoining pixels among all the pixels constituting the image into one large pixel based on a predetermined relationship, and expresses the image with large pixels;

a contour pixel extraction unit that extracts contour large pixels based on image data, the contour large pixels representing the contour of a shape included in the image;

a dot creation decision unit that determines creation or non-creation of each of the at least two variable-size dots with regard to each large pixel based on the image data, and selects one of the at least two variable-size dots, which is to be created in each of the extracted contour large pixels, based on the image data with regard to the preset number of adjoining pixels collected into the contour large pixel; and a dot creation unit that actually creates the at least two variable-size dots, based on results of the determination and the selection with regard to the respective large pixels by said dot creation decision unit.

5. A printer in accordance with claim 4, wherein a position of creating a predetermined-size dot among the at least two variable-size dots is shifted in a preset direction from a position of creating another dot among the at least two variable-size dots when the predetermined-size dot and the another dot are formed in an identical pixel, and said dot creation decision unit analyzes a tone value distribution of the plurality of adjoining pixels collected into each contour large pixel, and determines that the predetermined-size dot is to be created in the contour large pixel when the tone value distribution is deviated in a direction substantially identical with the preset direction.

6. A printer in accordance with claim 4, wherein said resolution reduction unit collects the plurality of adjoining pixels in a main scanning direction into a large pixel, a position of creating a predetermined-size dot among the at least two variable-size dots is shifted in the main scanning direction from a position of creating another dot among the at least two variable-size dots when the predetermined-size dot and the another dot are formed in an identical pixel, and said dot creation decision unit analyzes a tone value distribution of the plurality of adjoining pixels collected into each contour large pixel, and determines that the predetermined-size dot is to be created in the contour large pixel when the tone value distribution is deviated in a direction substantially identical with the main scanning direction.

7. A printer in accordance with claim 4, wherein said dot creation decision unit comprises:

a tentative dot creation storage unit that tentatively determines creation or non-creation of each of the at least two variable-size dots in each large pixel based on the image data, and stores a result of the tentative determination;

a contour dot determination unit that selects one of the at least two variable-size dots, which is to be created in each contour large pixel, based on the image data with regard to the plurality of adjoining pixels collected into the contour large pixel; and a definite dot creation decision unit that rewrites the result of the tentative determination in order to create the selected dot in each contour large pixel, and settles the rewritten result as a result of the determination by said dot creation decision unit.

8. A printer having a print head that enables creation of at least two variable-size dots, said printer driving said print head and carrying out both main scan and sub-scan to print an image, said printer comprising:

a contour pixel extraction unit that extracts contour pixels based on image data, the contour pixels representing the contour of a shape included in the image;

a dot creation decision unit that determines creation or non-creation of each of the at least two variable-size dots with regard to each pixel based on the image data, said dot creation decision unit dividing each of the contour pixels into a plurality of adjoining small pixels and selecting one of the at least two variable-size dots, which is to be created in each of the contour pixels, based on tone values of the respective small pixels that are specified according to a predetermined relationship; and a dot creation unit that actually creates the at least two variable-size dots, based on results of the determination and the selection with regard to the respective pixels by said dot creation decision unit.

9. A printer in accordance with claim 8, wherein a position of creating a predetermined-size dot among the at least two variable-size dots is shifted in a preset direction from a position of creating another dot among the at least two variable-size dots when the predetermined-size dot and the another dot are formed in an identical pixel, and said dot creation decision unit analyzes a tone value distribution with regard to the plurality of adjoining small pixels, which are obtained by dividing each contour pixel, and determines that the predetermined-size dot is to be created in the contour pixel when the tone value distribution is deviated in a direction substantially identical with the preset direction.

10. A printer in accordance with claim 8, wherein a position of creating a predetermined-size dot among the at least two variable-size dots is shifted in a main scanning direction from a position of creating another dot among the at least two variable-size dots when the predetermined-size dot and the another dot are formed in an identical pixel, and said dot creation decision unit analyzes a tone value distribution with regard to the plurality of adjoining small pixels, which are obtained by dividing each contour pixel in the main scanning direction, and determines that the predetermined-size dot is to be created in the contour pixel when the tone value distribution is deviated in a direction substantially identical with the main scanning direction.

11. A printer in accordance with claim 8, wherein said dot creation decision unit comprises:

a tentative dot creation storage unit that tentatively determines creation or non-creation of each of the at least two variable-size dots in each pixel based on the image data, and stores a result of the tentative determination;

a contour dot determination unit that selects one of the at least two variable-size dots, which is to be created in each contour pixel, based on the tone values of the respective small pixels that are specified according to the predetermined relationship; and a definite dot creation decision unit that rewrites the result of the tentative determination in order to create the selected dot in each contour pixel, and settles the rewritten result as a result of the determination by said dot creation decision unit.

12. A method of driving a print head and carrying out both main scan and sub-scan to print an image, said print head enabling creation of at least two variable-size dots, that is, a larger-size dot and a smaller-size dot, said method comprising the steps of:

(a) extracting contour pixels based on image data, the contour pixels representing the contour of a shape included in the image;

(b) determining creation or non-creation of each of the at least two variable-size dots with regard to each pixel based on the image data, and allocating the smaller-size dot to each of the contour pixels extracted in said step (a); and (c) actually creating the at least two variable-size dots, based on results of the determination and the allocation with regard to the respective pixels in said step (b).

13. A method of driving a print head and carrying out both main scan and sub-scan to print an image, said print head enabling creation of at least two variable-size dots, said method comprising the steps of:

(a) collecting every preset number of adjoining pixels among all the pixels constituting the image into one large pixel based on a predetermined relationship, and expressing the image with large pixels;

(b) extracting contour large pixels based on image data, the contour large pixels representing the contour of a shape included in the image;

(c) determining creation or non-creation of each of the at least two variable-size dots with regard to each large pixel based on the image data, and selecting one of the at least two variable-size dots, which is to be created in each of the extracted contour large pixels, based on the image data with regard to the preset number of adjoining pixels collected into the contour large pixel; and (d) actually creating the at least two variable-size dots, based on results of the determination and the selection with regard to the respective large pixels in said step (c).

14. A method of driving a print head and carrying out both main scan and sub-scan to print an image, said print head enabling creation of at least two variable-size dots, said method comprising the steps of:

(a) extracting contour pixels based on image data, the contour pixels representing the contour of a shape included in the image;

(b) determining creation or non-creation of each of the at least two variable-size dots with regard to each pixel based on the image data, dividing each of the contour pixels into a plurality of adjoining small pixels, and selecting one of the at least two variable-size dots, which is to be created in each of the contour pixels, based on tone values of the respective small pixels that are specified according to a predetermined relationship; and (c) actually creating the at least two variable-size dots, based on results of the determination and the selection with regard to the respective pixels in said step (b).

15. A recording medium, on which a program is recorded in a computer readable manner, said program being used in a printer that enables creation of at least two variable-size dots, that is, a larger-size dot and a smaller-size dot, said program being activated to carry out a predetermined operation for image data representing the image, in order to determine creation or non-creation of each of the at least two variable-size dots, said program comprising:

a program code that causes a computer to extract contour pixels based on the image data, the contour pixels representing the contour of a shape included in the image; and a program code that causes the computer to determine creation or non-creation of each of the at least two variable-size dots with regard to each pixel based on the image data, and to allocate the smaller-size dot to each of the contour pixels.

16. A recording medium, on which a program is recorded in a computer readable manner, said program being used in a printer that enables creation of at least two variable-size dots, said program being activated to carry out a predetermined operation for image data representing the image, in order to determine creation or non-creation of each of the at least two variable-size dots, said program comprising:

a program code that causes a computer to collect every preset number of adjoining pixels among all the pixels constituting the image into one large pixel based on a predetermined relationship, and to express the image with large pixels;

a program code that causes the computer to extract contour large pixels based on image data, the contour large pixels representing the contour of a shape included in the image; and a program code that causes the computer to determine creation or non-creation of each of the at least two variable-size dots with regard to each large pixel based on the image data, and to select one of the at least two variable-size dots, which is to be created in each of the extracted contour large pixels, based on the image data with regard to the preset number of adjoining pixels collected into the contour large pixel.

17. A recording medium, on which a program is recorded in a computer readable manner, said program being used in a printer that enables creation of at least two variable-size dots, said program being activated to carry out a predetermined operation for image data representing the image, in order to determine creation or non-creation of each of the at least two variable-size dots with regard to each pixel, said program comprising:

a program code that causes a computer to extract contour pixels based on image data, the contour pixels representing the contour of a shape included in the image; and a program code that causes the computer to determine creation or non-creation of each of the at least two variable-size dots with regard to each pixel based on the image data, to divide each of the contour pixels into a plurality of adjoining small pixels, and to select one of the at least two variable-size dots, which is to be created in each of the contour pixels, based on tone values of the respective small pixels that are specified according to a predetermined relationship.

* * * * *

UNITED STATES PATENT AND TRADEMARK OFFICE
CERTIFICATE OF CORRECTION

PATENT NO. : 6,731,398 B1 Page 1 of 1
DATED : May 4, 2004
INVENTOR(S) : Koichi Yoshizawa It is certified that error appears in the above-identified patent and that said Letters Patent is hereby corrected as shown below:

Title page,
Item 56, References Cited, please insert below FOREIGN PATENT DOCUMENTS -
-- JP    11-1313    1/6/99 --.

Signed and Sealed this

Thirty-first Day of August, 2004

JON W. DUDAS
*Director of the United States Patent and Trademark Office*